United States Patent
Yamamoto et al.

(10) Patent No.: US 9,772,430 B2
(45) Date of Patent: Sep. 26, 2017

(54) LIGHT CONTROL MEMBER, METHOD FOR MANUFACTURING SAME, AND DISPLAY DEVICE

(71) Applicant: Sharp Kabushiki Kaisha, Osaka-shi, Osaka (JP)

(72) Inventors: Emi Yamamoto, Osaka (JP); Toru Kanno, Osaka (JP); Tsuyoshi Maeda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 265 days.

(21) Appl. No.: 14/394,551

(22) PCT Filed: Apr. 8, 2013

(86) PCT No.: PCT/JP2013/060629
§ 371 (c)(1),
(2) Date: Oct. 15, 2014

(87) PCT Pub. No.: WO2013/157431
PCT Pub. Date: Oct. 24, 2013

(65) Prior Publication Data
US 2015/0062492 A1 Mar. 5, 2015

(30) Foreign Application Priority Data
Apr. 18, 2012 (JP) ................. 2012-095136

(51) Int. Cl.
*G02F 1/1335* (2006.01)
*G02B 5/02* (2006.01)
*G02B 5/00* (2006.01)

(52) U.S. Cl.
CPC ............ *G02B 5/0221* (2013.01); *G02B 5/001* (2013.01); *G02B 5/003* (2013.01); *G02B 5/0278* (2013.01);
(Continued)

(58) Field of Classification Search
CPC ............ G02F 1/133504; G02B 5/0221; G02B 5/0247; G02B 5/003; G02B 5/02
See application file for complete search history.

(56) References Cited

U.S. PATENT DOCUMENTS

| | | | |
|---|---|---|---|
| 5,521,726 A | 5/1996 | Zimmerman et al. | |
| 6,417,966 B1 * | 7/2002 | Moshrefzadeh | G03B 21/62 359/453 |

(Continued)

FOREIGN PATENT DOCUMENTS

| | | |
|---|---|---|
| JP | 2000-352608 A | 12/2000 |
| JP | 2007-517929 A | 7/2007 |

(Continued)

*Primary Examiner* — Jessica M Merlin
*Assistant Examiner* — Mark Teets
(74) *Attorney, Agent, or Firm* — Keating & Bennett, LLP

(57) ABSTRACT

A light control film (light control member) includes a light transmissive base, a plurality of light shielding portions scattered over one surface of the base, and a light diffusing portion formed on the one surface of the base in a region other than regions in which the light shielding portions are formed. The light diffusing portion has a light exit end face and a light incident end face having a larger area than the light exit end face, and the height of the light diffusing portion is greater than the thickness of the light shielding portions. At least part of the opening of at least some of a plurality of air-cavities has a protrusion which is formed of a portion of the light diffusing portion that projects toward the inner side of the opening.

20 Claims, 23 Drawing Sheets

(52) U.S. Cl.
CPC .. *G02F 1/133504* (2013.01); *G02F 1/133524* (2013.01)

(56) References Cited

U.S. PATENT DOCUMENTS

| | | | |
|---|---|---|---|
| 2002/0080484 A1* | 6/2002 | Moshrefzadeh | G03B 21/625 359/460 |
| 2005/0152032 A1 | 7/2005 | Olofson et al. | |
| 2006/0176562 A1* | 8/2006 | Goto | G02B 5/021 359/599 |
| 2008/0252963 A1* | 10/2008 | Lee | G02B 5/208 359/350 |
| 2010/0283947 A1* | 11/2010 | Nishihara | G02B 17/006 349/112 |
| 2012/0200930 A1* | 8/2012 | Yamamoto | G02B 5/0231 359/599 |
| 2013/0329401 A1* | 12/2013 | Yamamoto | G02B 5/0247 362/97.2 |
| 2014/0160410 A1 | 6/2014 | Yamamoto et al. | |

FOREIGN PATENT DOCUMENTS

| | | | | |
|---|---|---|---|---|
| JP | 4129991 B2 | 8/2008 | | |
| JP | WO 2011052255 A1 * | 5/2011 | ........... | G02B 5/0231 |
| WO | 2012/053501 A1 | 4/2012 | | |

\* cited by examiner

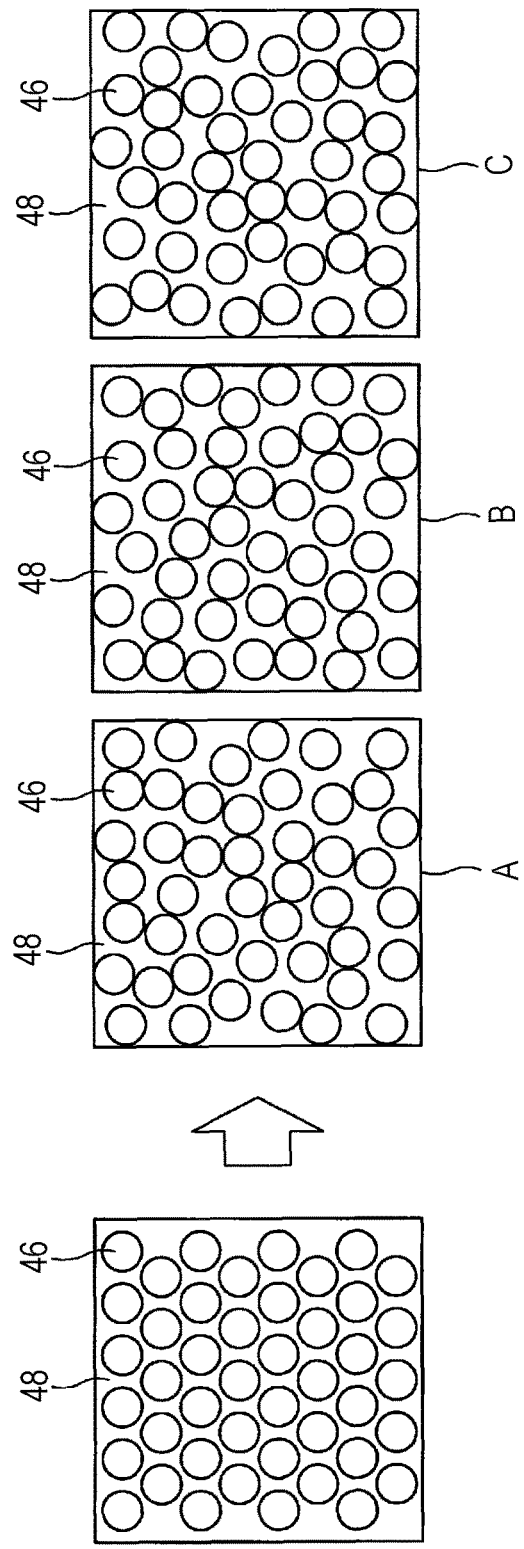

69

70

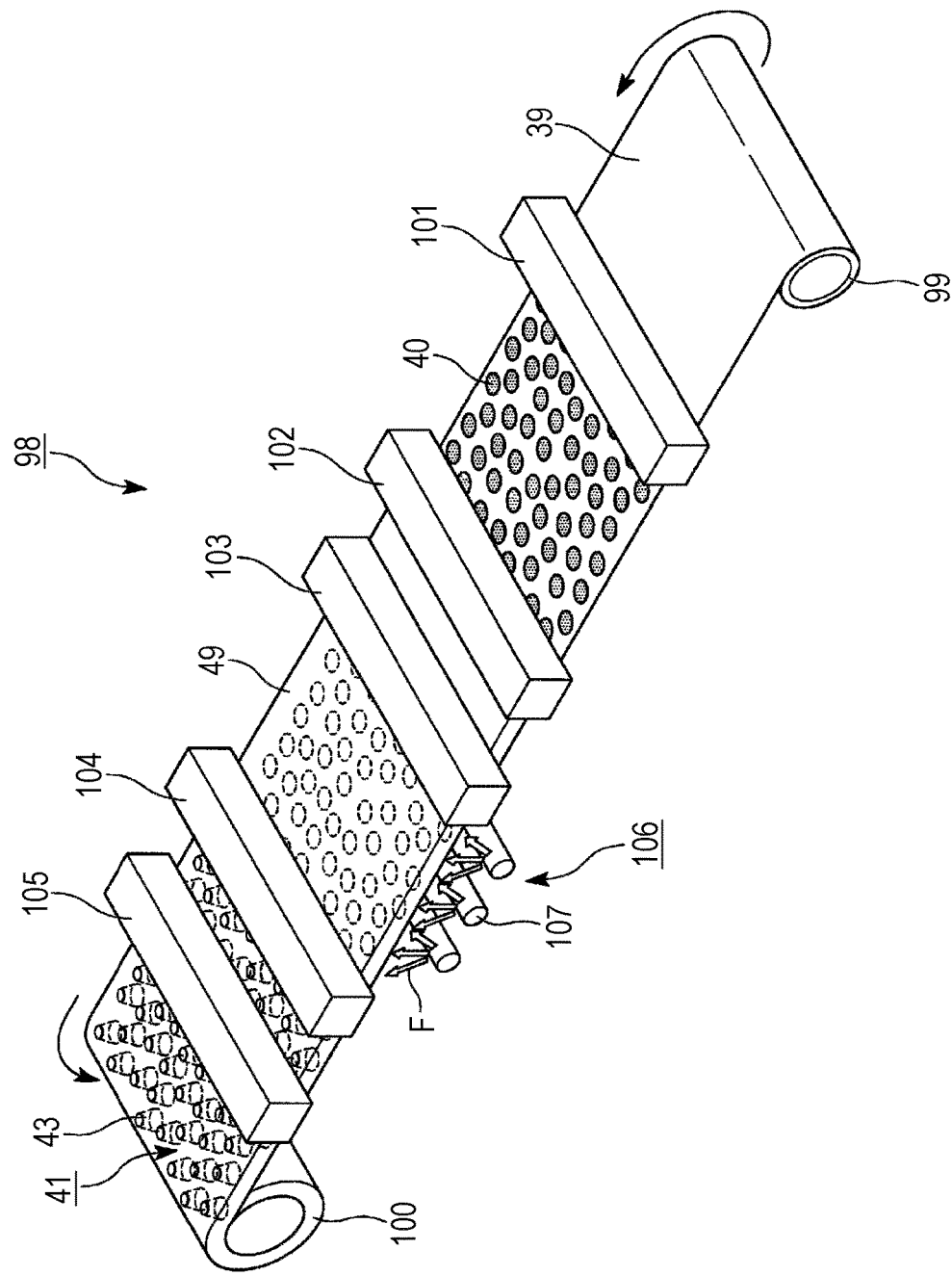

LIGHT CONTROL MEMBER, METHOD FOR MANUFACTURING SAME, AND DISPLAY DEVICE

TECHNICAL FIELD

The present invention relates to a light control member, a method for manufacturing the same, and a display device.

The present application claims the benefit of priority of Japanese Patent Application No. 2012-095136 filed in Japan on Apr. 18, 2012, and the contents thereof are incorporated herein.

BACKGROUND ART

Liquid crystal display devices are widely used for monitors of portable electronic devices including mobile phones, televisions, personal computers, and the like. It is known that liquid crystal display devices generally provide good visibility when seen from the front but have a narrow viewing angle. To address this, various techniques for expanding the viewing angle have been proposed. One of such proposals is providing a member for controlling the angle of diffusion of light emitted from a display unit such as a liquid crystal panel (hereinafter referred to as "light control member") on the viewing side of the display unit.

For instance, PTL 1 listed below discloses a rear projection screen including a base having multiple light diffusion ribs and a light transmissive shield containing light-absorbing adhesive. This rear projection screen is structured such that space between the light diffusion ribs is partially filled with light absorbing adhesive. PTL 2 listed below discloses a light diffusion sheet having grooves with a V-shaped cross section formed in a light diffusion layer and a light absorption layer provided in part of the grooves.

CITATION LIST

Patent Literature

PTL 1: Japanese Unexamined Patent Application Publication (Translation of PCT Application) No. 2007-517929
PTL 2: Japanese Unexamined Patent Application Publication No. 2000-352608

SUMMARY OF INVENTION

Technical Problem

In the rear projection screen described in PTL 1, the light diffusion ribs in the base is bonded to the light transmissive shield by light absorbing adhesive provided in small spaces between neighboring light diffusion ribs. Thus, adhesion between the light diffusion ribs and the light transmissive shield is low, possibly leading to separation between the light diffusion ribs and the light transmissive shield. Additionally, in the manufacturing process of the screen, light absorbing adhesive can remain in the area of contact between the light diffusion ribs and the light transmissive shield, namely the path of light passage, and cause reduction in optical efficiency.

The light diffusion sheet described in PTL 2 requires a light shielding sheet on which a light absorption layer is formed to be bonded to a light diffusion layer having grooves with high precision during the manufacturing process. This can take much processing time at the bonding step and lower the productivity. In addition, if there is a misalignment in bonding of the light shielding sheet and the light diffusion layer, it can result in decreased optical efficiency as with PTL 1.

Several aspects of the present invention have been made in order to solve the problems outlined above, and have an object of providing a light control member that has high mechanical strength and can control the angle of light diffusion without causing reduction in optical efficiency. Another object is to provide a method for manufacturing a light control member with high productivity. A further object is to provide a display device including the light control member and having excellent display quality.

Solution to Problem

To attain the objects, a light control member according to an aspect of the invention includes: a light transmissive base; a plurality of light shielding portions formed so as to be scattered over one surface of the base; and a light diffusing portion formed on the one surface of the base in a region other than regions in which the light shielding portions are formed, wherein the light diffusing portion has a light exit end face on the base side, the light diffusing portion has a light incident end face having a larger area than the light exit end face on a side opposite to the base side, a height between the light incident end face and the light exit end face of the light diffusing portion is greater than a thickness of the light shielding portions, spaces defined by the light shielding portions and side faces of the light diffusing portion are air-cavities, and at least part of an opening of at least some of a plurality of air-cavities corresponding to the plurality of light shielding portion has a protrusion which is formed of a portion of the light diffusing portion that projects toward an inner side of the opening. The light diffusing portion formed on the one surface of the base in a region other than regions in which the light shielding portions are formed includes a light diffusing portion formed in a region substantially outside regions in which the light shielding portions are formed. By "a light diffusing portion formed in a region substantially outside regions in which the light shielding portions are formed", it is meant that it includes a light diffusing portion formed partially overlapping light shielding portions.

In the light control member according to an aspect of the invention, the plurality of light shielding portions may be arranged aperiodically when seen from a normal direction of the one surface of the base.

In the light control member according to an aspect of the invention, at least one of the plurality of light shielding portions may have different dimensions from the dimensions of other light shielding portions.

In the light control member according to an aspect of the invention, planar shapes of the plurality of light shielding portions as seen from the normal direction of the one surface of the base may at least include an anisotropic shape having a long axis and a short axis.

In the light control member according to an aspect of the invention, the planar shapes of the plurality of light shielding portions as seen from the normal direction of the one surface of the base may at least include an isotropic shape in addition to the anisotropic shape.

In the light control member according to an aspect of the invention, the planar shapes of the plurality of light shielding portions as seen from the normal direction of the one surface of the base may at least include a polygon.

In the light control member according to an aspect of the invention, the planar shapes of the plurality of light shielding portions as seen from the normal direction of the one surface of the base may at least include a shape consisting of a curved line and a straight line.

In the light control member according to an aspect of the invention, the air-cavity may be filled with air or inert gas.

In the light control member according to an aspect of the invention, an inclination angle of at least one of a plurality of side faces of the light diffusing portion may be different from the inclination angles of other side faces.

In the light control member according to an aspect of the invention, the inclination angle of the side faces of the light diffusing portion may vary depending on location between the light exit end face and the light incident end face.

In the light control member according to an aspect of the invention, the side faces of the light diffusing portion may be inclined planes having a curved cross section with a continuously varying inclination angle.

In the light control member according to an aspect of the invention, the side faces of the light diffusing portion may be inclined planes with a polygonal cross section having a plurality of different inclination angles.

The light control member according to an aspect of the invention may further include a light scattering layer for scattering light emitted from the light diffusing portion on a light exit side of the light diffusing portion.

In the light control member according to an aspect of the invention, the light shielding portions may consist of black resin containing at least one of light absorbing pigment, light absorbing dye, and carbon black, or metal, or multilayer film of metallic oxides.

In the light control member according to an aspect of the invention, at least one of an anti-reflection layer, a polarizing filter layer, an anti-static layer, a non-glare treatment layer, and an antifouling layer is provided on a side opposite to the one surface of the base.

A display device according to another aspect of the invention includes a display unit, and a viewing angle expanding member which is provided on a viewing side of the display unit and causes incident light from the display unit to exit with a wider angle distribution than before incidence, wherein the viewing angle expanding member includes the inventive light control member.

In the display device according to another aspect of the invention, the display unit and the viewing angle expanding member may be bonded together with adhesive.

In the display device according to another aspect of the invention, an information input device may be provided on a viewing side of the viewing angle expanding member.

In the display device according to another aspect of the invention, the display unit may include a light source and a light modulating element for modulating light from the light source, and the light source may emit light having directivity.

In the display device according to another aspect of the invention, the light modulating element may be a liquid crystal display element.

A method for manufacturing a light control member according to a further aspect of the invention includes: forming a plurality of light shielding portions on one surface of a light transmissive base so as to be scattered; forming a negative photosensitive resin layer having light transmissivity on the one surface of the base so as to cover the plurality of light shielding portions; irradiating the negative photosensitive resin layer with light through the base in regions other than the regions in which the light shielding portions are formed from the side opposite to the one surface of the base on which the light shielding portions and the negative photosensitive resin layer have been formed; and developing the negative photosensitive resin layer after the irradiation with light and forming air-cavities in the regions in which the light shielding portions are formed on the negative photosensitive resin layer, the air-cavities being shaped such that their cross sectional area in a plane parallel to the one surface of the base is large on the light shielding portion side and gradually decreases with distance from the light shielding portion.

In the method for manufacturing a light control member according to the further aspect of the invention, collimated light, diffused light, or light whose intensity at a particular exit angle is different from the intensity at another exit angle may be used for the light with which the negative photosensitive resin layer is irradiated.

Advantageous Effects of Invention

According to several aspects of the invention, a light control member having high mechanical strength and capable of controlling the angle of light diffusion without causing reduction in optical efficiency can be provided. According to several aspects of the invention, a method for manufacturing a light control member with high productivity can be provided. According to several aspects of the invention, a display device including the light control member and having excellent display quality can be provided.

BRIEF DESCRIPTION OF DRAWINGS

FIG. 10B is a diagram for describing the arrangement of light shielding portions in the light control film.

FIG. 21 is a perspective view showing an exemplary manufacturing device for the light control film according to a fifth embodiment.

DESCRIPTION OF EMBODIMENTS

First Embodiment

A first embodiment of the present invention is described below with reference to FIGS. 1 to 13.

This embodiment is described by taking as an example a liquid crystal display device including a transmissive liquid crystal panel as the display unit.

In all the drawings referenced below, the scale may be varied among components in the interest of clarity.

Figure 1:
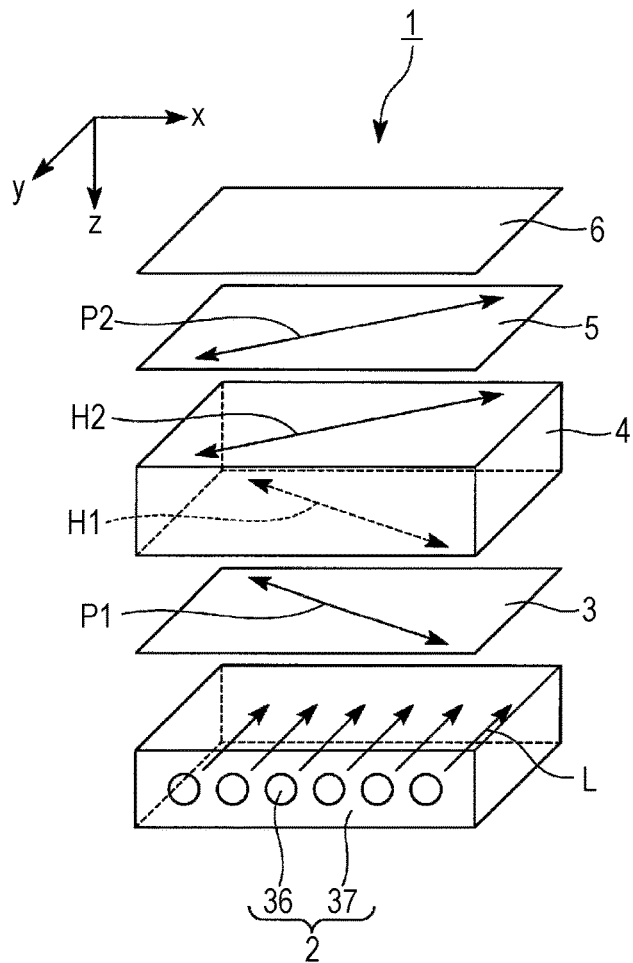
FIG. 1 is a perspective view showing a general structure of a liquid crystal display device in a first embodiment of the invention.

FIG. 1 is a perspective view of a liquid crystal display device 1 according to this embodiment seen from diagonally above (the viewing side). As shown in FIG. 1, the liquid crystal display device 1 in this embodiment includes a backlight 2 (an illumination device), a first polarizing plate 3, a liquid crystal panel 4, a second polarizing plate 5, and a light control film 6 (a light control member). While FIG. 1 schematically depicts the liquid crystal panel 4 as a plate-like object, its detailed structure will be described later.

The observer will see display from the upper side of the liquid crystal display device 1 in FIG. 1 on which the light control film 6 is disposed. In the following description, the side on which the light control film 6 is disposed will be referred to as the viewing side and the side on which the backlight 2 is disposed will be referred to as the backside. Also, in the following description, the x-axis is defined as the horizontal direction of the screen of the liquid crystal display device 1, the y-axis is defined as the vertical direction of the screen of the liquid crystal display device 1, and the z-axis is defined as the thickness direction of the liquid crystal display device 1.

With the liquid crystal display device 1 of this embodiment, light emitted from the backlight 2 is modulated in the liquid crystal panel 4 and certain images and/or characters are displayed with the modulated light. When light emitted from the liquid crystal panel 4 passes through the light control film 6, the light exits the light control film 6 with a wider luminous intensity distribution (diffusion angle distribution) than before entering the light control film 6. This enables the observer to see display from a wider viewing angle.

The specific construction of the liquid crystal panel 4 is described below.

While an active matrix transmissive liquid crystal panel is described as an example herein, liquid crystal panels to which this embodiment is applicable are not limited to active matrix transmissive liquid crystal panels. A liquid crystal panel to which this embodiment is applicable may be instead a semi-transmissive (hybrid transmissive-reflective) liquid crystal panel for example, or even a passive matrix liquid crystal panel having no switching thin film transistors (hereinafter abbreviated as TFT) provided in pixels.

Figure 3:
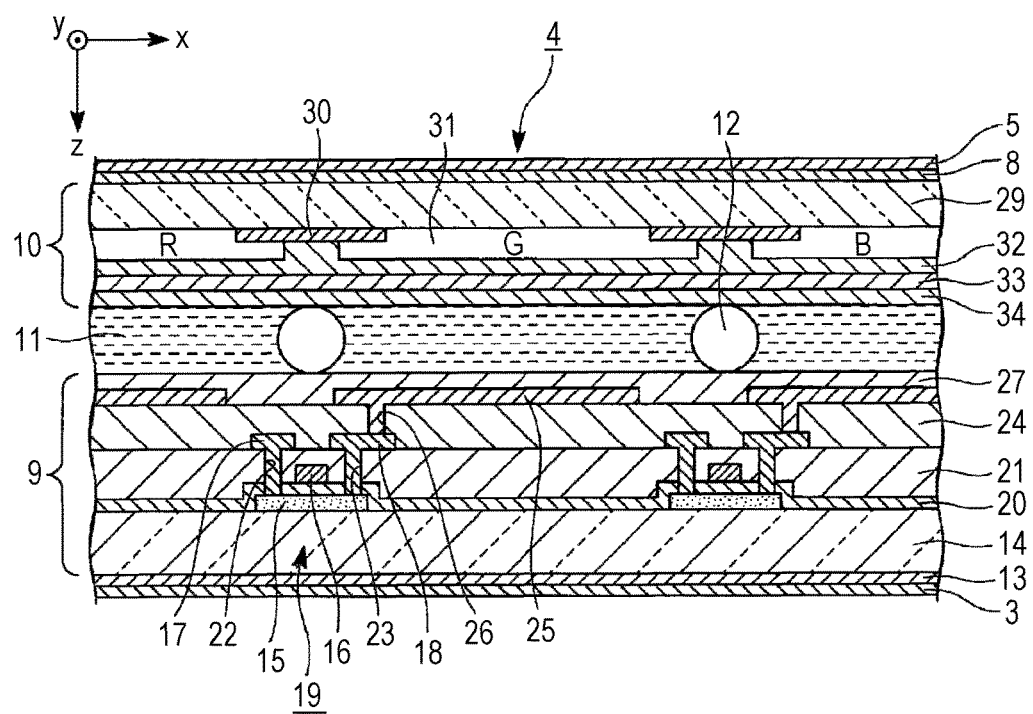
FIG. 3 is a cross-sectional view showing a liquid crystal panel for use in the liquid crystal display device.

FIG. 3 is a vertical cross-sectional view of the liquid crystal panel 4.

As shown in FIG. 3, the liquid crystal panel 4 includes a TFT substrate 9 serving as a switching element substrate, a color filter substrate 10 disposed opposite the TFT substrate 9, and a liquid crystal layer 11 disposed between the TFT substrate 9 and the color filter substrate 10. The liquid crystal layer 11 is contained in a space defined by the TFT substrate 9, the color filter substrate 10, and a frame-shaped sealing member (not shown) which bonds the TFT substrate 9 to the color filter substrate 10 at a certain amount of spacing. The liquid crystal panel 4 of this embodiment effects display in twisted nematic (TN) mode, for example, and liquid crystal having positive dielectric anisotropy is used in the liquid crystal layer 11. Between the TFT substrate 9 and the color filter substrate 10, spherical spacers 12 for keeping the spacing between the two substrates constant are disposed.

In addition to the TN mode, the liquid crystal display device according to the present invention may employ such display modes as vertical alignment (VA) mode, super twisted nematic (STN) mode, in-plane switching (IPS) mode, and fringe field switching (FFS) mode. The liquid crystal panel illustrated in this embodiment employs the TN mode.

On the TFT substrate 9, multiple pixels (not shown), which are the smallest unit regions of display, are arranged in a matrix. In the TFT substrate 9, multiple source bus lines (not shown) are formed so as to extend parallel to each other. In the TFT substrate 9, multiple gate bus lines (not shown) are formed such that they extend parallel to each other and are orthogonal to the source bus lines. Consequently, multiple source bus lines and multiple gate bus lines are formed in a grid on the TFT substrate 9. A rectangular region defined by neighboring source bus lines and neighboring gate bus lines represents a pixel. The source bus lines are connected to the source electrodes of the TFT described below and the gate bus lines are connected to the gate electrodes of the TFT.

On the surface of a transparent substrate 14 forming the TFT substrate 9 on the liquid crystal layer 11 side, a TFT 19 including a semiconductor layer 15, a gate electrode 16, a source electrode 17, a drain electrode 18, and so forth is formed. For the transparent substrate 14, a glass substrate may be employed, for example. On the transparent substrate 14, the semiconductor layer 15, which is formed from semiconductor material such as continuous grain silicon (CGS), low-temperature poly-silicon (LPS), and amorphous silicon (α-Si), is formed. On the transparent substrate 14, a gate dielectric film 20 is formed so as to cover the semiconductor layer 15. The material of the gate dielectric film 20 may be silicon oxide film, silicon nitride film, or a laminated film thereof, for example.

On the gate dielectric film 20, the gate electrode 16 is formed opposite the semiconductor layer 15. The material of the gate electrode 16 may be a laminated film of tungsten (W)/tantalum nitride (TaN), molybdenum (Mo), titanium (Ti), aluminum (Al), and the like, for example.

On the gate dielectric film 20, a first interlayer dielectric film 21 is formed so as to cover the gate electrode 16. The material of the first interlayer dielectric film 21 may be silicon oxide film, silicon nitride film, or a laminated film thereof, for example. On the first interlayer dielectric film 21, the source electrode 17 and the drain electrode 18 are formed. The source electrode 17 is connected to the source region of the semiconductor layer 15 through a contact hole 22, which is formed through the first interlayer dielectric film 21 and the gate dielectric film 20.

Likewise, the drain electrode 18 is connected to the drain region of the semiconductor layer 15 through a contact hole 23, which is formed through the first interlayer dielectric film 21 and the gate dielectric film 20. For the material of the source electrode 17 and the drain electrode 18, an electrically conductive material similar to the gate electrode 16 is used. On the first interlayer dielectric film 21, a second interlayer dielectric film 24 is formed so as to cover the source electrode 17 and the drain electrode 18. The second interlayer dielectric film 24 may be formed from material similar to that of the first interlayer dielectric film 21 or organic insulating material.

On the second interlayer dielectric film 24, a pixel electrode 25 is formed. The pixel electrode 25 is connected to the drain electrode 18 through a contact hole 26 which is formed through the second interlayer dielectric film 24. The pixel electrode 25 is thus connected with the drain region of the semiconductor layer 15 via the drain electrode 18 as a relay electrode. The pixel electrode 25 is made from transparent electrically conductive material, such as indium tin oxide (ITO) and indium zinc oxide (IZO), for example.

With this construction, when a scanning signal is supplied through a gate bus line and the TFT 19 turns on, an image signal supplied to the source electrode 17 through a source bus line is supplied to the pixel electrode 25 via the semiconductor layer 15 and the drain electrode 18. An alignment film 27 is formed on the entire surface of the second interlayer dielectric film 24 so as to cover the pixel electrode 25. The alignment film 27 has alignment controlling effect to horizontally orient the liquid crystal molecules constituting the liquid crystal layer 11. The TFT may be either a top-gate TFT as shown in FIG. 3 or a bottom-gate TFT.

On the surface of the transparent substrate 29 forming the color filter substrate 10 on the liquid crystal layer 11 side, a black matrix 30, a color filter 31, a planarizing layer 32, a counter electrode 33, and an alignment film 34 are formed in sequence. The black matrix 30 has the function of blocking light in inter-pixel regions. The black matrix 30 is formed from metal such as chromium (Cr) or multilayer film of Cr/Cr oxide, or photoresist containing carbon particles dispersed in photosensitive resin. The color filter 31 contains dyes of red (R), green (G), and blue (B) colors. The color filter 31 is provided such that one of R, G, and B is positioned opposite each pixel electrode 25 on the TFT substrate 9.

The planarizing layer 32 is formed from insulator film that covers the black matrix 30 and the color filter 31. The planarizing layer 32 has the function of lessening and smoothing unevenness caused by the black matrix 30 and the color filter 31. On the planarizing layer 32, a counter electrode 33 is formed. For the material of the counter electrode 33, transparent electrically conductive material similar to the pixel electrode 25 is used. The alignment film 34, having horizontal alignment controlling effect, is formed over the surface of the counter electrode 33. The color filter 31 may have a multicolor configuration including three colors R, G, B plus additional color(s).

Between the transparent substrate 14 forming the TFT substrate 9 and the first polarizing plate 3, a first retardation plate 13 is provided. Between the transparent substrate 29 forming the color filter substrate 10 and the second polarizing plate 5, a second retardation plate 8 is provided. The first retardation plate 13 and the second retardation plate 8 compensate for light retardation caused by the liquid crystal layer 11.

Figure 2:
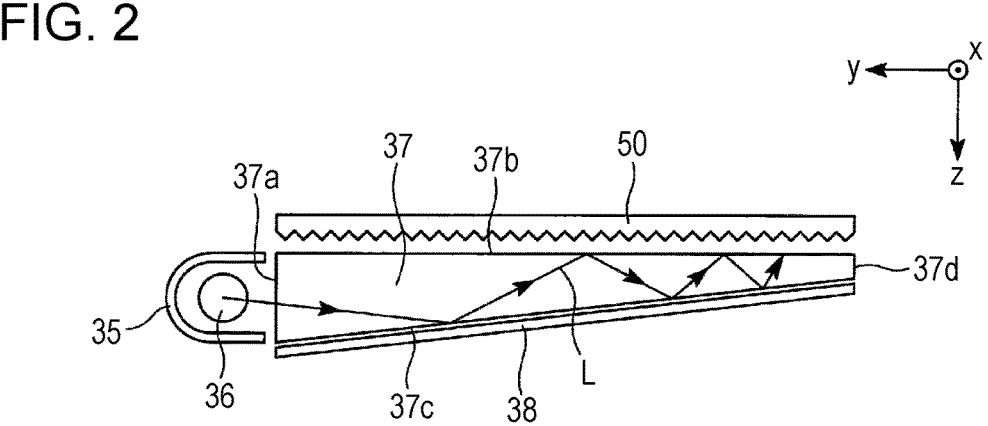
FIG. 2 is a cross-sectional view of a backlight for use in the liquid crystal display device.

As depicted in FIG. 2, the backlight 2 includes a light source 36 such as a light emitting diode or cold-cathode tube, a light guide 37 formed from acrylic resin or the like, a reflector 35, a reflective sheet 38, and a prism sheet 50. The light source 36 is disposed on one end face 37a of the light guide 37 having a rectangular planar shape, and emits light toward the end face 37a of the light guide 37. The light guide 37 transmits light incident from the end face 37a therethrough and causes it to exit from a front face 37b. The reflector 35 reflects toward the end face 37a of the light guide 37 light emitted from the light source 36 in directions other than the end face 37a of the light guide 37. The reflective sheet 38 reflects light emitted from the back face 37c of the light guide 37 to cause it to re-enter from the back face 37c of the light guide 37. The prism sheet 50 has multiple prism structures 42a having a triangle pole shape disposed parallel to each other. When light enters the prism sheet 50 from the front face 37b of the light guide 37, the prism sheet 50 changes the direction of travel of the light so that the light exits in a direction close to the direction of the normal of the liquid crystal panel 4. The backlight 2 in this embodiment is an edge light backlight with the light source 36 disposed on the end face 37a of the light guide 37.

The backlight 2 in this embodiment is a backlight that controls the exit direction of light to give it directivity, a so-called directional backlight. Specifically, the thickness of the light guide 37 gradually decreases from the end face 37a on which the light source 36 is disposed toward an end face 37d on the opposite side. Thus, the front face 37b and the back face 37c of the light guide 37 are not parallel to each other; the light guide 37 is wedge-shaped when seen from the side. Light entering the light guide 37 from the end face 37a travels through the light guide 37 in the y-axis direction while being repeatedly reflected between the front face 37b and the back face 37c of the light guide 37. If the light guide plate is a parallel plate, the light incident angle relative to the front face and back face of the light guide plate would remain constant however many times reflection is repeated. In contrast, with the wedge-shaped light guide 37 of this embodiment, the incident angle decreases each time light is reflected on the front face 37b and the back face 37c of the light guide 37.

Assuming that the acrylic resin forming the light guide 37 has a refractive index of 1.5 and that of air is 1.0, for example, the critical angle on the front face 37b of the light guide 37, that is, the critical angle at the interface between the acrylic resin forming the light guide 37 and air, is about 42° by Snell's law.

When light that has just entered the light guide 37 is incident on the front face 37b, a total reflection condition is satisfied while the incident angle of light L on the front face 37b remains greater than 42°, that is, the critical angle, so light L is totally reflected on the front face 37b. Light L subsequently repeats total reflection between the front face 37b and the back face 37c, and when the incident angle of light L on the front face 37b has become smaller than 42°, or the critical angle, the total reflection condition is no longer satisfied and light L exits to the external space. Consequently, light L exits at a substantially constant exit angle relative to the front face 37b of the light guide 37. As seen from the above, the backlight 2 has a narrow luminous intensity distribution in the y-z plane and has directivity in the y-z plane. On the other hand, the backlight 2 has a wider luminous intensity distribution in the x-z plane than in the y-z plane and has no directivity in the x-z plane.

As shown in FIG. 1, between the backlight 2 and the liquid crystal panel 4, the first polarizing plate 3, functioning as polarizer, is provided. Assuming here that angle is represented counterclockwise referenced to the positive direction of the x-axis, the transmission axis P1 of the first polarizing plate 3 is set at 135°-315° direction. Between the liquid crystal panel 4 and the light control film 7, the second polarizing plate 5, functioning as analyzer, is provided. The transmission axis P2 of the second polarizing plate 5 is oriented to be orthogonal to the transmission axis P1 of the first polarizing plate 3, being set at 45°-225° direction. The transmission axis P1 of the first polarizing plate 3 and the transmission axis P2 of the second polarizing plate 5 are in crossed-Nicols arrangement.

The alignment film 27 of the TFT substrate 9 has been subjected to alignment treatment such as rubbing so that it has an alignment control direction of 135°-315°. In FIG. 1, the alignment control direction of the alignment film 27 is represented by arrow H1. The alignment film 34 of the color filter substrate 10 has been subjected to alignment treatment such as rubbing so that it has an alignment control direction of 45°-225°. In FIG. 1, the alignment control direction of the alignment film 34 is represented by arrow H2.

Figure 4A:
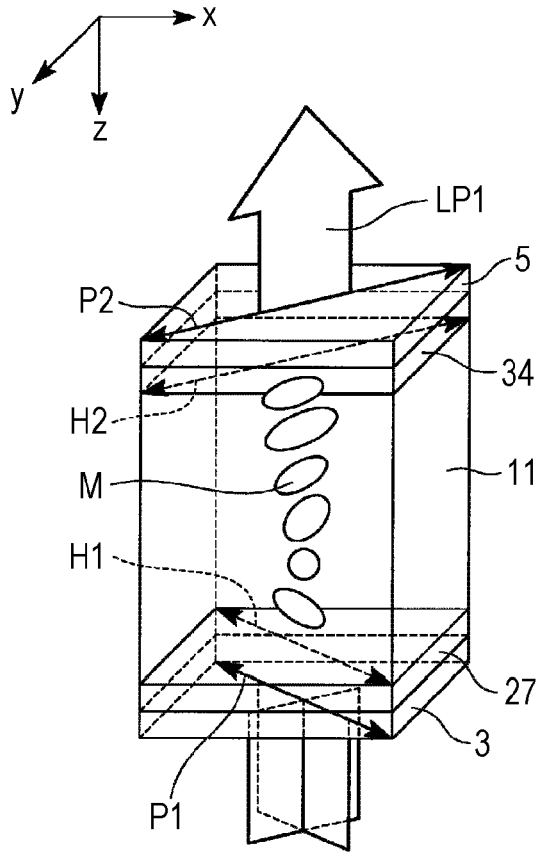
FIG. 4A is a diagram for describing the operation of a liquid crystal panel.

When no voltage is applied between the pixel electrode 25 and the counter electrode 33 of the liquid crystal panel 4, liquid crystal molecules M constituting the liquid crystal layer 11 are 90° twisted between the two alignment films 27 and 34 as depicted in FIG. 4A. In this state, the plane of polarization of linearly polarized light LP1 that has passed through the first polarizing plate 3, having the transmission axis P1 in 135°-315° direction, rotates 90° due to the optical rotatory power of the liquid crystal layer 11, and passes through the second polarizing plate 5 having the transmission axis P2 in 45°-225° direction. As a result, white is displayed when no voltage is applied.

Figure 4B:
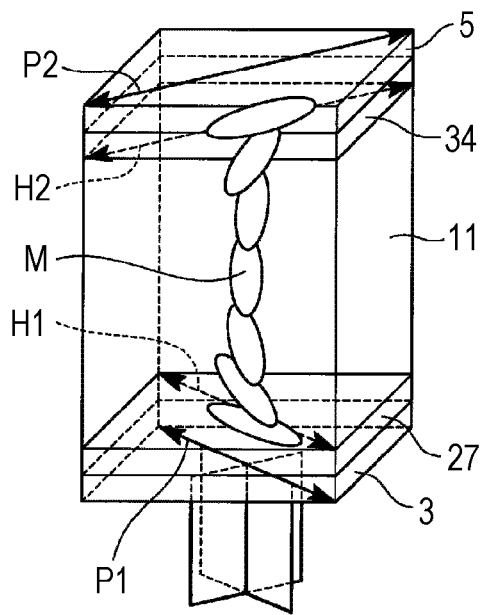
FIG. 4B is a diagram for describing the operation of a liquid crystal panel.

When a voltage is applied between the pixel electrode 25 and the counter electrode 33, the liquid crystal molecules M constituting the liquid crystal layer 11 stand up in the direction along the electric field between the two alignment films 27 and 34 as depicted in FIG. 4B. In this state, the plane of polarization of linearly polarized light that has passed through the first polarizing plate 3 having the transmission axis P1 in 135°-315° direction does not rotate and hence does not pass through the second polarizing plate 5 having the transmission axis P2 in 45°-225° direction. As a result, black is displayed when voltage is applied. By thus controlling the application and non-application of voltage on a pixel-by-pixel basis, display is switched between white and black and an image can be displayed.

Next, the light control film 6 is described in detail.

Figure 5:
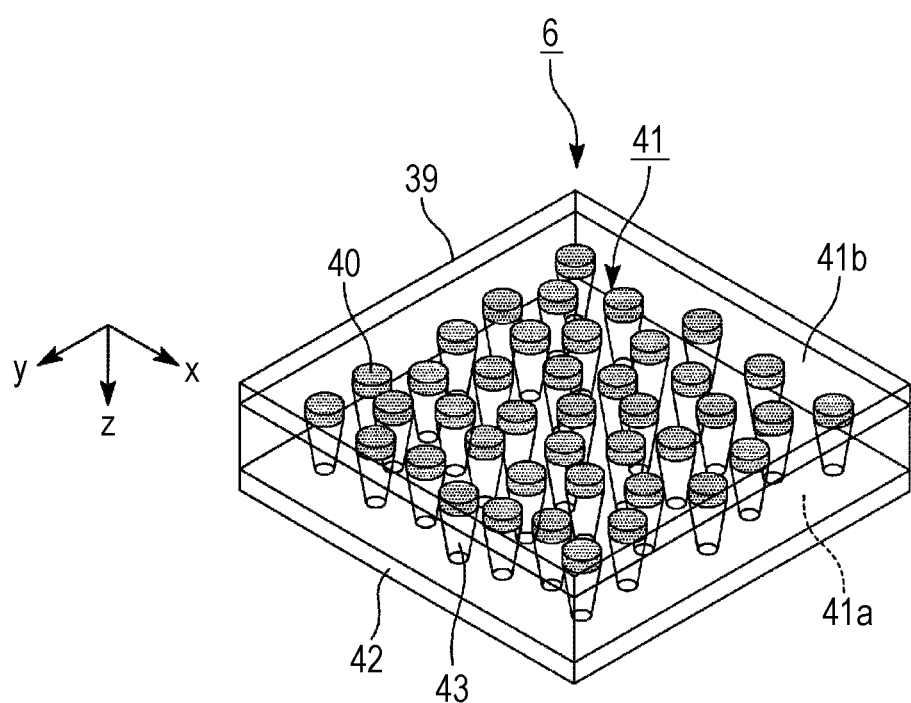
FIG. 5 is a perspective view of a light control film for use in the liquid crystal display device.
Figure 6A:
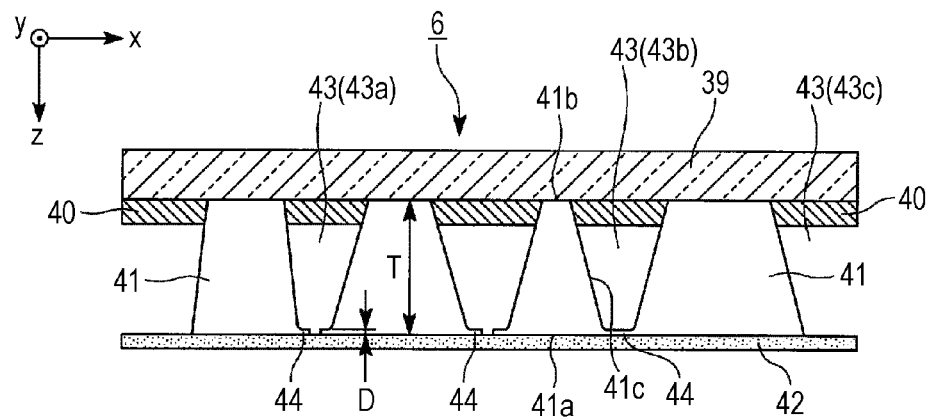
FIG. 6A is a cross-sectional view of the light control film.
Figure 6B:
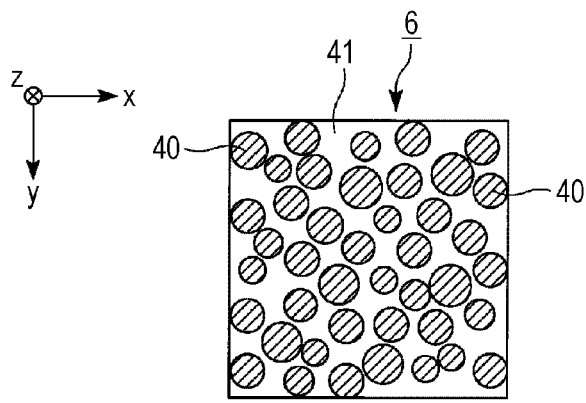
FIG. 6B is a plan view of the light control film seen from the light exit side.
Figure 6C:
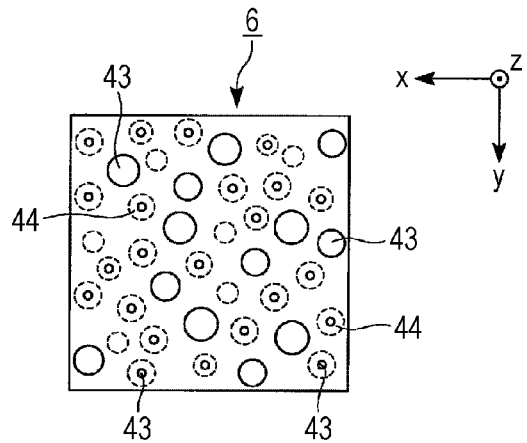
FIG. 6C is a plan view of the light control film seen from the light incident side.

FIG. 5 is a perspective view of the light control film 6 seen from the viewing side. FIG. 6A is a cross-sectional view of the light control film 6; FIG. 6B is a plan view of the light control film 6 seen from the light exit side; and FIG. 6C is a plan view of the light control film 6 seen from the light incident side.

As shown in FIG. 5, the light control film 6 includes a base 39, multiple light shielding portions 40 formed on one surface (the side opposite to the viewing side) of the base 39, and a light diffusing portion 41 formed on the surface of the base 39. The light control film 6 is fixed to the second polarizing plate 5 with the adhesive layer 42 such that the side on which the light diffusing portion 41 is provided faces the second polarizing plate 5 and the base 39 side faces the viewing side.

For a light transmissive base 39, light transmissive materials such as resins including thermoplastic polymers, thermosetting resins, and light-polymerized resins are typically employed. A base made from an appropriate transparent resin, such as acrylic polymers, olefin-based polymers, vinyl-based polymers, cellulose-based polymers, amide-based polymers, fluorine-based polymers, urethane-based polymers, silicone-based polymers, and imide-based polymers, may be employed. Preferably, a base formed from transparent resin is used, for example, triacetylcellulose (TAC) film, polyethylene terephthalate (PET) film, cycloolefin polymer (COP) film, polycarbonate (PC) film, polyethylene naphthalate (PEN) film, polyethersulfone (PES) film, and polyimide (PI) film.

The base 39 serves as a foundation on which to apply materials of the light shielding portions 40 and light diffusing portion 41 later in the manufacturing process discussed below and is required to have heat resistance and mechanical strength to withstand a heat processing step in the manufacturing process. Thus, the base 39 may be a base made of glass and the like in addition to resin-based materials. However, the base 39 is preferably thin to the extent that heat resistance and mechanical strength are not lost. This is because blur of display is more likely to occur as the thickness of the base 39 increases. The base 39 also preferably has a total light transmittance of 90% or higher pursuant to the requirement of JIS K7361-1. With a total light transmittance of 90% or higher, sufficient transparency is obtained. This embodiment uses PET film having a thickness of 100 μm as an example of transparent resin-based material for the base 39.

As shown in FIGS. 6A and 6B, multiple light shielding portions 40 are formed so as to be scattered over one surface (the side opposite to the viewing side) of the base 39. In this embodiment, each light shielding portion 40 is circular in planar shape when seen from the direction of the normal of the base 39. The light shielding portions 40 vary in size and diameter. The light shielding portions 40 are arranged aperiodically, to be specific, randomly.

The light shielding portions 40 are formed of a layer consisting of black pigment, dye, resin, or the like having light absorbing property and photosensitivity, such as black resist containing carbon black, for example. When resin or the like containing carbon black is used, the film for forming the light shielding portions 40 can be fabricated in the printing step, leading to advantages of requiring less material and high throughput. Alternatively, metal film such as chromium (Cr) or a multilayer film of Cr/Cr oxide may be used. Use of such metal film or multilayer film has the advantage of sufficient absorption of light with thin film because these kinds of film have high optical density.

As illustrated in FIG. 6A, light diffusing portions 41 are formed in regions other than the regions in which the light shielding portions 40 are formed on the one surface of the base 39. The light diffusing portion 41 is made of organic material having light transmissivity and photosensitivity, for example, acrylic resin, epoxy resin, and silicone resin. A transparent resin mixture of such resin and polymerization initiator, coupling agent, monomer, organic solvent, and the like may be used. The polymerization initiator may contain various additional ingredients, such as stabilizing agent, inhibitor, plasticizer, fluorescent brightening agent, mold release agent, chain transfer agent, or other photopolymerizable monomers. The materials described in Japanese Patent No. 4129991 may be used as well. The transparent resin preferably has a total light transmittance of 90% or higher pursuant to the requirement of JIS K7361-1. With a total light transmittance of 90% or higher, sufficient transparency is obtained. The height (thickness) of the light diffusing portion 41 is designed to be sufficiently greater than the thickness of the light shielding portions 40. In this embodiment, the light diffusing portions 41 are about 25 μm high and the light shielding portions 40 are about 150 nm thick by way of example.

In the region in which each light shielding portion 40 is formed, an air-cavity 43 is formed as a space shaped such that its cross sectional area in a plane parallel to one surface of the base 39 is large on the light shielding portion 40 side and gradually decreases with distance from the light shielding portion 40. In other words, the air-cavity 43 has a shape of a so-called forward tapered truncated cone when seen from the base 39 side. The inside of the air-cavity 43 is filled with air. Thus, the portions other than the air-cavities 43 on the one surface side of the base 39, that is, the portions in which transparent resin is continuously present like a wall constitute the light diffusing portions 41 contributing to light diffusion. After entering the light diffusing portion 41, light travels therein being substantially confined inside the light diffusing portion 41 while causing total reflection on the interface 41c between the light diffusing portion 41 and the air-cavity 43 to exit to the outside through the base 39.

As depicted in FIGS. 6A and 6C, in at least part of the openings of at least some of the air-cavities 43 corresponding to the light shielding portions 40, a portion of the light diffusing portion 41 protrudes toward the inner side of the opening. In other words, the end of the light diffusing portion 41 on the side opposite to the base 39 projects like a hood. In the following description, the portion of the light diffusing portion 41 that projects toward the inside of the opening will be referred to as a protrusion 44. In this embodiment, protrusions 44 are formed in some air-cavities 43 that have relatively small diameters and no protrusion 44 is formed in the remaining air-cavities 43 having relatively large diameters as shown in FIG. 6C. It is arbitrary however in which ones of the air-cavities 43 protrusions 44 are formed; the protrusion 44 may be provided in all of the air-cavities 43.

In this embodiment, in some air-cavities 43 (such as one indicated by reference character 43a in FIG. 6A), the protrusion 44 does not reach the center of the opening and the center of those air-cavities 43 is opened.

That is, the opening of some air-cavities 43 is narrowed due to the presence of the protrusion 44 but is not completely blocked. In other air-cavities 43 (such as one indicated by reference character 43b in FIG. 6A), the protrusion 44 extends to the center of the opening, completely blocking the opening of the air-cavity 43. In still other air-cavities 43 (such as one indicated by reference character 43c in FIG. 6A), no protrusion 44 is present. Thus, all of the three types of air-cavities 43a, 43b, and 43c may be present, or only one or both of two types of air-cavities 43a and 43b, which at least have the protrusion 44, may be present. In FIG. 5, illustration of protrusions 44 is omitted for the sake of clarity.

Figure 7A:
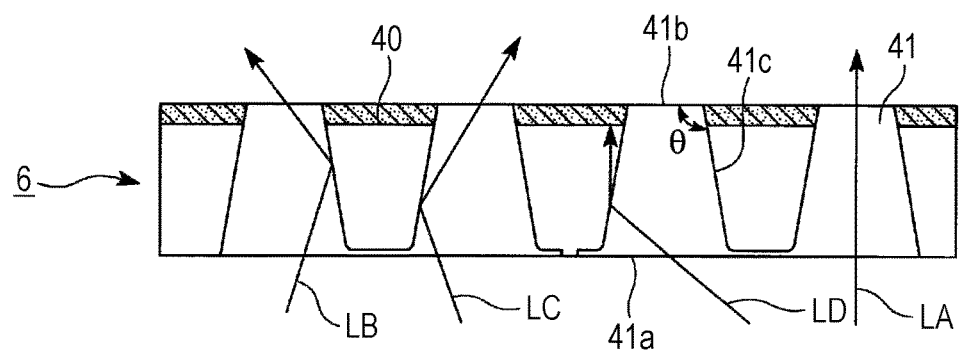
FIG. 7A is a diagram for describing light reflection on side faces of a light diffusing portion in the light control film.

Since the light control film 6 is disposed such that the base 39 faces the viewing side as shown in FIG. 5, of the two opposite parallel surfaces of the light diffusing portion 41, the smaller surface (the surface on the side in contact with the base 39) serves as a light exit end face 41b and the larger surface (the surface on the opposite side to the base 39) serves as a light incident end face 41a as shown in FIG. 7A. The inclination angle θ (the angle formed by the light exit end face 41b and the side face 41c) of the side face 41c of the light diffusing portion 41 (the interface between the light diffusing portion 41 and the air-cavity 43) is designed to be in the range of 41° to 89°. The inclination angle θ is particularly preferably about 60° to 85°. There is no limitation on the inclination angle of the side face 41c of the light diffusing portion 41 however as long as it is an angle that does not cause substantial loss of incident light and allows sufficient diffusion of incident light. In this embodiment, the side faces 41c of the light diffusing portion 41 have varying inclination angles θ as illustrated in FIG. 6A.

In the following description, the inclination angle θ of the side face 41c of the light diffusing portion 41 will be also called the taper angle θ of the light diffusing portion 41.

Figure 7B:
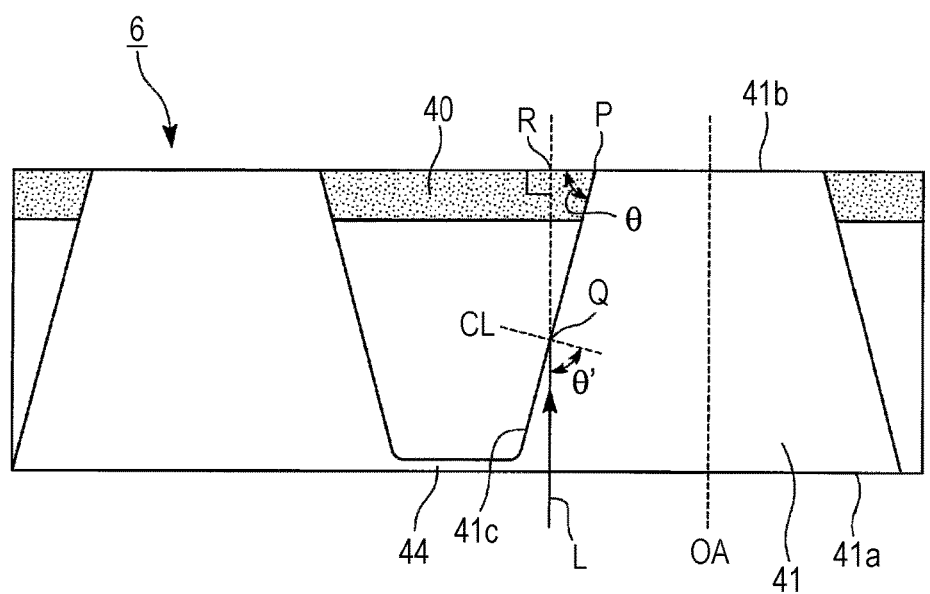
FIG. 7B is a diagram for describing light reflection on side faces of a light diffusing portion in the light control film.

As shown in FIG. 7B, the inclination angle θ of the side face 41c of the light diffusing portion 41 is designed to be an angle θ' (in degrees) that exceeds the critical angle with respect to the normal CL of the side face 41c of the light diffusing portion 41 so that light L which is incident parallel to or substantially parallel to the optical axis OA is totally reflected. The angle θ formed between the side face 41c of the light diffusing portion 41 and the light exit end face 41b which is orthogonal to the optical axis OA can be represented by angle QPR, where P represents the point at which the side face 41c of the light diffusing portion 41 intersects the light exit end face 41b; Q represents the point of incident on the side face 41c of incident light L parallel with the optical axis OA; and R represents the point of intersection of the vertical line that passes through point Q among vertical lines to the light exit end face 41b and the light exit end face 41b. Then, since the value of angle PQR is (90−θ°), the inclination angle θ of the side face 41c of the light diffusing portion 41 is equal to the incident angle θ' of incident light L at point Q. Thus, the inclination angle θ of the side face 41c of the light diffusing portion 41 is formed as an angle exceeding the critical angle.

Since air is present in the air-cavities 43 in this embodiment, if the light diffusing portion 41 is formed from transparent acrylic resin for example, the side face 41c of the light diffusing portion 41 becomes the interface between transparent acrylic resin and air. The difference in refractive index at the interface between the light diffusing portion 41 and the air-cavity 43 is largest when the air-cavities 43 are filled with air compared to when filled with other general materials with a low refractive index. Therefore, by Snell's law, the incident angle range which causes total reflection of light on the side face 41c of the light diffusing portion 41 is widest when the air-cavities 43 are filled with air. This suppresses light loss more and results in high luminance. The air-cavities 43 may be filled with inert gas, such as argon and nitrogen, instead of air. Alternatively, the inside of the air-cavities 43 may be vacuum. In these implementations, the above described effects are still attained.

Preferably, the base 39 and the light diffusing portion 41 have substantially equal refractive indices. This is because, if the refractive index of the base 39 is significantly different from that of the light diffusing portion 41, for example, unwanted refraction or reflection of light occurs in the interface between the light diffusing portion 41 and the base 39 when light incident from the light incident end face 41a exits from the light diffusing portion 41, possibly causing such phenomena as a desired viewing angle being not obtained, decrease in the amount of exit light, and the like.

Incident light that enters the side face 41c of the light diffusing portion 41 at an angle exceeding the critical angle, like the light indicated by arrows LB and LC in FIG. 7A, is totally reflected on the side face 41c of the light diffusing portion 41 to pass through the light diffusing portion 41 and exits to the observer's side. Incident light that passes through the light diffusing portion 41 without being incident on the side face 41c, like the light indicated by arrow LA in FIG. 7A, exits to the observer's side as is. Meanwhile, incident light that is incident at an angle equal to or less than the critical angle, like the light indicated by arrow LD in FIG. 7A, is not totally reflected on the side face 41c of the light diffusing portion 41 and passes through the side face 41c of the light diffusing portion 41.

Since this embodiment provides light shielding portions 40 having light absorbing property in regions other than the light diffusing portions 41, light that has passed through the side face 41c of the light diffusing portion 41 is absorbed by the light shielding portions 40. This prevents blur of display or reduction in contrast caused by stray light or the like. However, if light that passes through the side face 41c of the light diffusing portion 41 increases, the amount of light emitted to the viewing side decreases and an image with high luminance cannot be obtained. Thus, for the liquid crystal display device 1 of this embodiment, a backlight that emits light at such an angle that prevents it from entering the side face 41c of the light diffusing portion 41 at or below the critical angle, a so-called directional backlight, is preferably adopted.

Figure 8A:
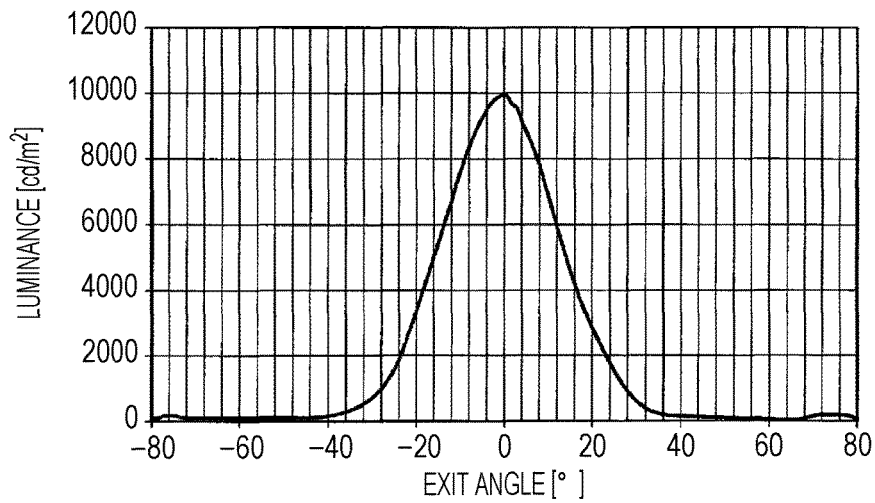
FIG. 8A shows the luminance-angle characteristics of a backlight.

FIG. 8A illustrates the luminance-angle characteristics of a directional backlight. In FIG. 8A, for light emitted by a directional backlight, the horizontal axis represents exit angle (°) and the vertical axis represents luminance (cd/m$^2$). It can be seen that with the directional backlight used in this embodiment, the exit angle of substantially all the emitted light falls in the range of ±30°. Combined use of the backlight 2 comprising a directional backlight with such properties and the light control film 6 can reduce blur and improve optical efficiency.

Figure 8B:
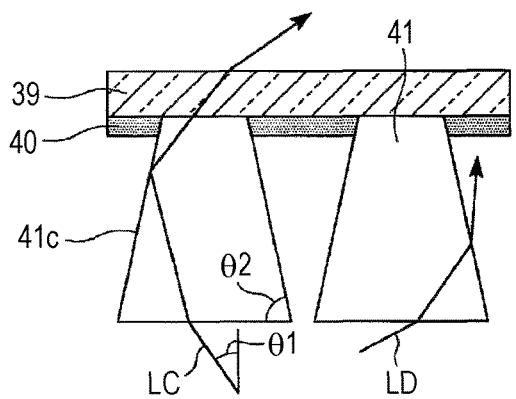
FIG. 8B is a diagram for describing the luminance-angle characteristics of a backlight.

As shown in FIG. 8B, $\theta_1$ is defined as the exit angle of light from the backlight 2, and $\theta_2$ is defined as the taper angle of the light diffusing portion 41. Light $L_C$ incident on the light diffusing portion 41 causes total reflection on the side face 41c and exits from the surface of the base 39 to the viewing side. As mentioned above, however, light $L_D$ at a large incident angle with respect to the side face 41c passes through without being totally reflected on the side face 41c, possibly causing loss of incident light.

In order to minimize light loss, the taper angle of the light diffusing portion 41 has to be appropriately designed.

Figure 8C:
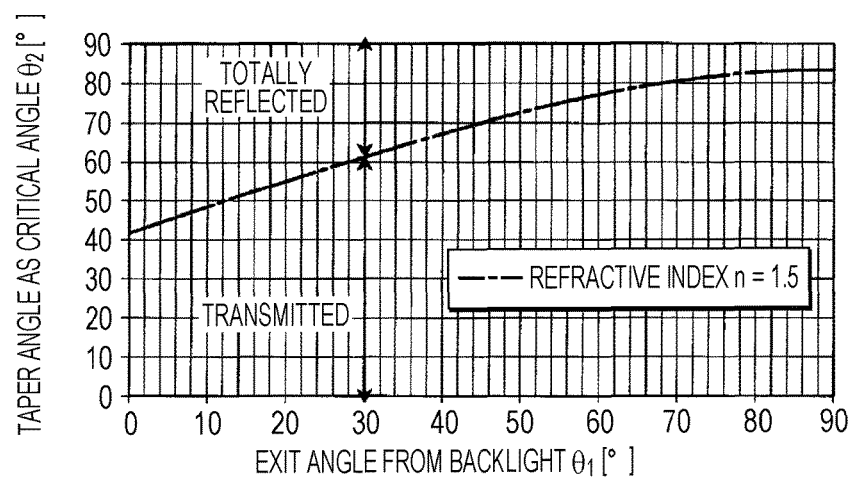
FIG. 8C is a diagram for describing the luminance-angle characteristics of a backlight.

FIG. 8C is a graph showing the relationship between the exit angle from the backlight 2 and the taper angle representing the critical angle.

For example, when the light diffusing portion 41 with a refractive index n=1.5 has a taper angle smaller than 60°, light emitted from the backlight 2 at an exit angle of 30° passes through without being totally reflected on the side face 41c, causing light loss. Thus, in order to cause light in the range of exit angle ±30° to be totally reflected on the side face 41c without loss, the taper angle of the light diffusing portion 41 is preferably at least 60° and less than 90°.

Next, the method for manufacturing the liquid crystal display device 1 of the above-described construction is described.

In brief outline, the manufacturing process of the liquid crystal panel 4 starts with fabrication of the TFT substrate 9 and the color filter substrate 10. Then, the TFT substrate 9 and the color filter substrate 10 are bonded via a sealing member, where they are disposed such that the side of the TFT substrate 9 on which the TFT 19 is formed and the side of the color filter substrate 10 on which the color filter 31 is formed face each other. Thereafter, liquid crystal is injected into the space defined by the TFT substrate 9, the color filter substrate 10, and the sealing member. To the opposite surfaces of the liquid crystal panel 4 thus assembled, the first retardation plate 13, the first polarizing plate 3, the second retardation plate 8, and the second polarizing plate 5 are bonded with optical adhesive or the like. Through this process, the liquid crystal panel 4 is completed.

As well-known methods are typically used for manufacturing of the TFT substrate 9 and the color filter substrate 10, description about manufacturing of them is omitted.

The following description mainly focuses on the manufacturing method for the light control film 6.

Figure 9A:
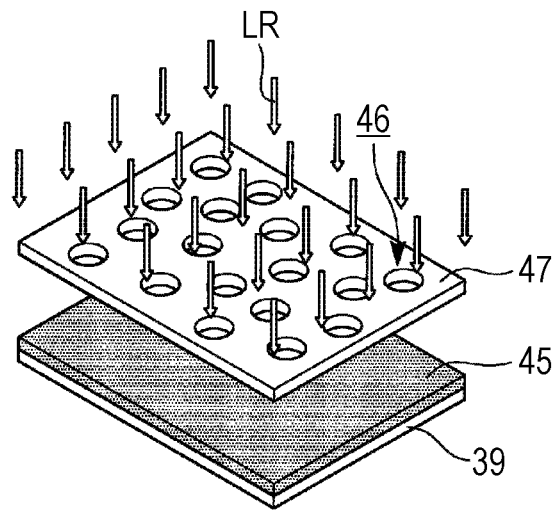
FIG. 9A is a perspective view illustrating the manufacturing process of the light control film.

First, as depicted in FIG. 9A, base 39 made of polyethylene terephthalate having a thickness of 100 μm is prepared, and black negative resist containing carbon is applied as the material of light shielding portions to one surface of the base 39, by spin coating, to form a coating 45 having a thickness of 150 nm.

Next, the base 39 with the coating 45 formed thereon is placed on a hot plate and the coating 45 is prebaked at a temperature of 90° C. This causes solvent in the black negative resist to be volatilized.

Figure 9B:
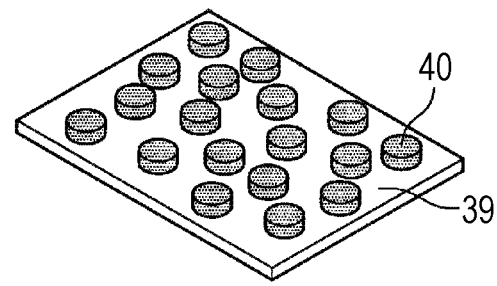
FIG. 9B is a perspective view illustrating the manufacturing process of the light control film.

Then, an exposure device is used to perform exposure by irradiating the coating 45 with light LR across a photomask 47 in which multiple aperture patterns 46 having a circular planar shape are formed. Here, an exposure device that employs a combination of i-line with 365-nm wavelength, K-line with 404-nm wavelength, and g-line with 436-nm wavelength is used. Exposure dose is 100 mJ/cm$^2$. In the photomask 47 in this embodiment, aperture patterns 46 circular in planar shape are randomly arranged as illustrated in FIG. 9A. By irradiating the coating 45 made of black negative resist with light LR through the photomask 47 and developing it, randomly arranged light shielding portions 40 are formed on the base 39 as shown in FIG. 9B.

Here, an illustrative approach to designing a photomask 47 with multiple aperture patterns 46 randomly arranged in it is shown.

Figure 10A:
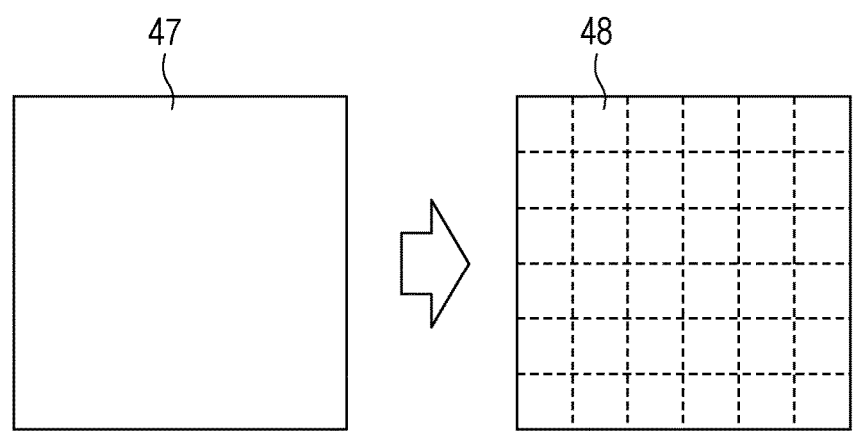
FIG. 10A is a diagram for describing the arrangement of light shielding portions in the light control film.

First, as illustrated in FIG. 10A, the entire portion of the photomask 47 is divided into m×n (36 for example) blocks 48 including m (six, for example) blocks vertically and n (six, for example) blocks horizontally.

Then, as shown in FIG. 10B, in one of the blocks 48 formed in the preceding step, a pattern in which circles corresponding to the shapes of the aperture patterns 46 are arranged at the maximum density is created (the leftmost illustration in FIG. 10B). Then, a random function is used to give fluctuations to position data which is to be the reference for the position of each circle, such as the center coordinates of each circle, and multiple kinds of position data (three kinds of pattern, A, B, and C, for example) are created (the three illustrations on the right in FIG. 10B).

Figure 10C:
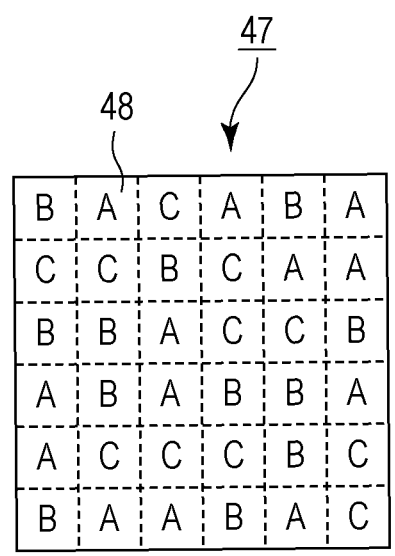
FIG. 10C shows the arrangement of light shielding portions in the light control film.

Next, as shown in FIG. 10C, the multiple kinds of position data A, B, C created in the preceding step are randomly assigned to the m×n blocks 48. For example, the position data A, B, C are assigned to the blocks 48 such that the position data A, B, and C randomly appear in the 36 blocks 48. Accordingly, when the photomask 47 is seen in each block 48, the arrangement of aperture patterns 46 in each block 48 matches one of the patterns of position data A, B, and C; it is not that all the aperture patterns 46 are arranged totally at random in all the blocks 48. When the photomask 47 is seen in its entirety, however, the aperture patterns 46 are randomly arranged.

Through the procedure, the photomask 47 can be designed.

After performing light exposure using the photomask 47, the coating 45 formed from black negative resist is developed with dedicated developer and dried at 100° C., forming multiple light shielding portions 40 having a circular planar shape on the one surface of the base 39 as depicted in FIG. 9B. In this embodiment, exposure of transparent negative resist is performed using the light shielding portions 40 formed from black negative resist as a mask in the following step to form the air-cavities 43. The positions of the aperture patterns 46 in the photomask 47 therefore correspond to the positions where air-cavities 43 are formed. The circular light shielding portions 40 correspond to the non-formation regions of light diffusing portions 41 (the air-cavities 43) in the next step.

The aperture patterns 46 of the photomask 47 are circles having different diameters on the order of several tens μm, and the interval (pitch) between neighboring aperture patterns 46 is also about several tens μm and varies. It is preferable however that the pitch of the aperture patterns 46 is smaller than the pixel interval (pitch, 150 μm for instance) on the liquid crystal panel 4. Since this results in at least one light shielding portion 40 being formed in a pixel, a wide viewing angle is achieved when combined with a liquid crystal panel having a small pixel pitch for use with mobile devices, for example.

While this embodiment forms the light shielding portions 40 by photolithography using black negative resist, a light-absorbing positive resist could be used instead by means of a photomask having inverted patterns of the aperture pattern 46 and the light shielding pattern of this embodiment. Alternatively, the light shielding portions 40 may be directly formed by vapor deposition, printing, ink-jetting, or the like.

Figure 9C:
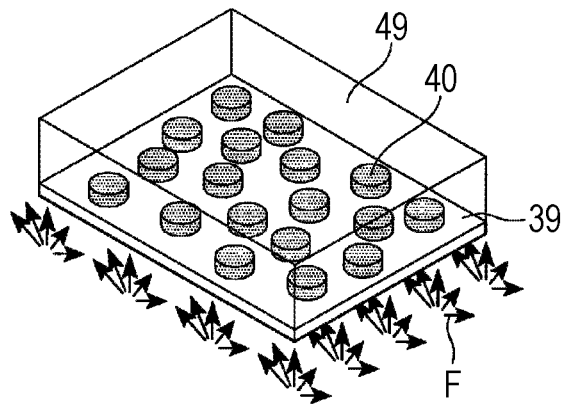
FIG. 9C is a perspective view illustrating the manufacturing process of the light control film.

Then, as shown in FIG. 9C, transparent negative resist formed from acrylic resin is applied as the material of the light diffusing portion to the upper surface of the light shielding portions 40 by spin coating to form a coating 49 having a thickness of 25 μm.

Next, the base 39 with the coating 49 formed on it is placed on a hot plate and the coating 49 is prebaked at a temperature of 95° C. This causes solvent in the transparent negative resist to be volatilized.

Exposure is then performed by applying diffused light F to the coating 49 from the base 39 side across the light shielding portions 40 as a mask. Here, an exposure device that employs a combination of i-line with a wavelength of 365 nm, h-line with a wavelength of 404 nm, and g-line with a wavelength of 436 nm is used. The exposure dose is 600 mJ/cm$^2$. As a means for applying collimated light emitted from the exposure device to the base 39 as diffused light F, a diffuser plate with a haze value of about 50 may be placed on the path of the light emitted from the exposure device, for example. By exposure with diffused light F, the coating 49 is exposed to light radially from the clearances between light shielding portions 40, so that the reverse-tapered side faces 41c of the light diffusing portions 41 are formed.

The base 39 with the coating 49 formed thereon is then placed on a hot plate and the coating 49 is post-exposure baked (PEB) at a temperature of 95° C.

Figure 9D:
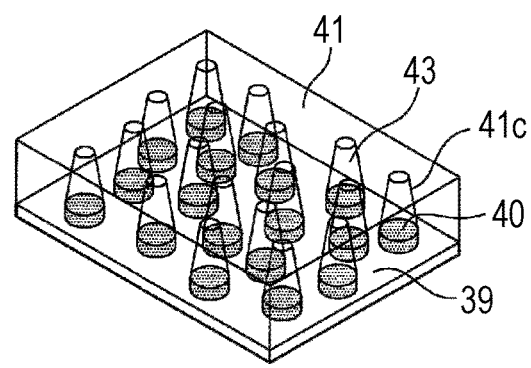
FIG. 9D is a perspective view illustrating the manufacturing process of the light control film.

Then, the coating 49 formed from transparent negative resist is developed using dedicated developer and post-baked at 100° C. to form multiple light diffusing portions 41 with air-cavities 43 on the one surface of the base 39 as shown in FIG. 9D. Since this embodiment uses diffused light F for exposure as shown in FIG. 9C, transparent negative resist forming the coating 49 is exposed to light radially outwardly from the non-formation regions of the light shielding portions 40. This forms forward-tapered air-cavities 43, while making light diffusing portions 41 reverse-taper shaped. The inclination angle of the side face 41c of the light diffusing portions 41 can be controlled with the degree of diffusion of diffused light F.

The light F used here may be diffused light, collimated light, or light whose intensity at a particular exit angle is different from that at another exit angle, that is, light having intensity differences at particular exit angles. With collimated light, the inclination angle of the side face 41c of the light diffusing portion 41 becomes a single inclination angle ranging from about 60° to 85°, for example. With diffused light F, an inclined plane having a curved cross section with a continuously varying inclination angle is formed. When light having different intensities at particular exit angles is used, an inclined plane having inclination angles corresponding to the different intensities is formed. The inclination angle of the side face 41c of the light diffusing portion 41 can be thus adjusted. This enables adjustment of the light diffusion properties of the light control film 6 so as to provide the intended visibility.

Figure 23:
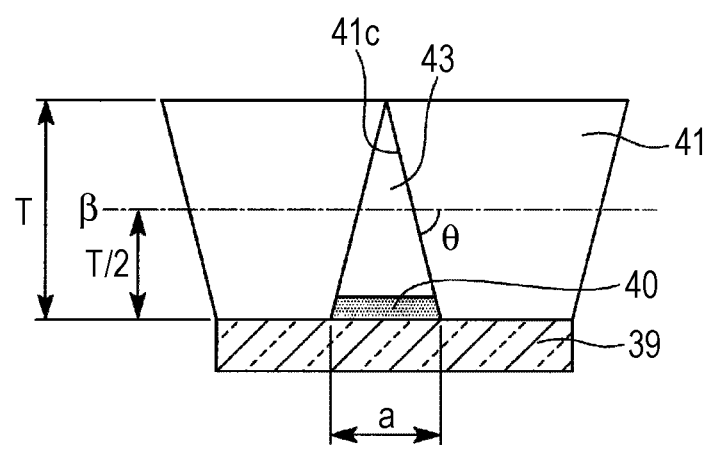
FIG. 23 is a cross-sectional view of a light control film for illustrating conditions that facilitate formation of a protrusion.

In the aforementioned manufacturing process, air-cavities 43 having varying planar dimensions are formed as a result of forming light shielding portions 40 with varying planar dimensions. By appropriately setting the distribution of the sizes of air-cavities 43 in this process, underdevelopment (burring) of the coating 49, which forms the light diffusing portion 41, occurs to create protrusions 44 in some air-cavities 43 that have relatively small diameters. As depicted in FIG. 23, when the diameter of light shielding layer 40 is represented by a, the thickness of the light diffusing portion 41 is represented by T, and the angle formed by the side face 41c of the light diffusing portion 41 and a straight line β parallel with the one surface of the base 39 at the midpoint (the T/2 position) of the thickness of the light diffusing portion 41 is represented by θ on the one surface of the base 39, the protrusion 44 is easier to form as the relationship tan θ=2T/a is approached. The holes in the center of protrusions 44 depicted such as in FIG. 6C are traces of flowout of coating 49 solution dissolved in developer. Alternatively, protrusions 44 may be formed by adding a post-baking or other heat processing step after development so as to sag the edges of the coating 49 constituting the light diffusing portions 41.

Through the process illustrated in FIGS. 9A to 9D, the light control film 6 according to this embodiment is completed.

The light control film 6 preferably has a total light transmittance of 90% or higher. With a total light transmittance of 90% or higher, sufficient transparency is obtained so that the light control film 6 sufficiently provides the optical performance required of it. The total light transmittance conforms to the requirement of JIS K7361-1. While liquid resist is used in this embodiment, film-type resist may be used instead.

Finally, the completed light control film 6 is bonded to the liquid crystal panel 4 with the adhesive layer 42 interposed therebetween such that the base 39 is oriented to the viewing side and the light diffusing portion 41 faces the second polarizing plate 5 as illustrated in FIG. 6A.

Through the process, the liquid crystal display device 1 of this embodiment is completed.

The viewing angle expanding effect of the light control film 6 is described with reference to FIGS. 11A and 11B.

Figure 11A:
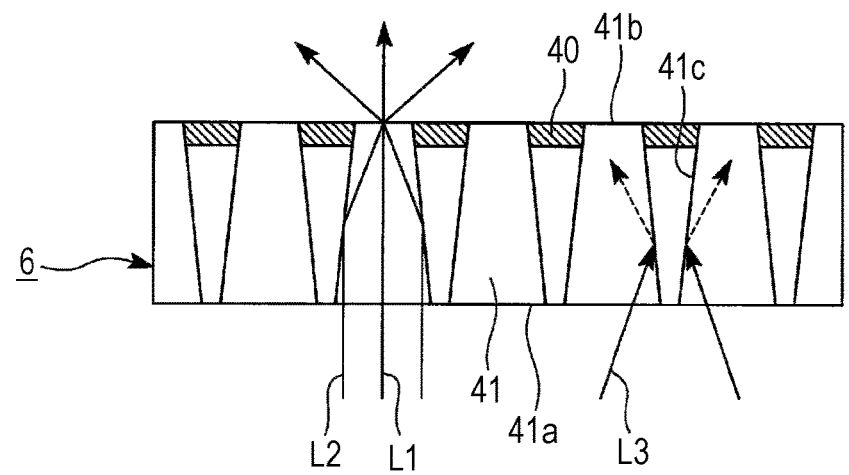
FIG. 11A schematically illustrates the effects of the light control film.

As shown in FIG. 11A, of light that is emitted from the liquid crystal panel 4 and enters the light control film 6, light L1 which is incident on the light incident end face 41a approximately vertically around the center of the light diffusing portion 41 travels straightly and passes through the light diffusing portion 41 without being totally reflected on the side face 41c of the light diffusing portion 41. Light L2 which is approximately vertically incident on the light incident end face 41a on a peripheral edge of the light diffusing portion 41 enters the side face 41c of the light diffusing portion 41 at an incident angle larger than the critical angle, so it is totally reflected on the side face 41c of the light diffusing portion 41. After the total reflection, the light is subsequently further refracted on the light exit end face 41b of the light diffusing portion 41 and exits in a direction that forms a large angle relative to the direction of the normal of the light exit end face 41b. Light L3 which enters the light incident end face 41a of the light diffusing portion 41 at an incident angle smaller than the critical angle passes through the side face 41c of the light diffusing portion 41 and is absorbed by the light shielding portions 40.

Figure 11B:
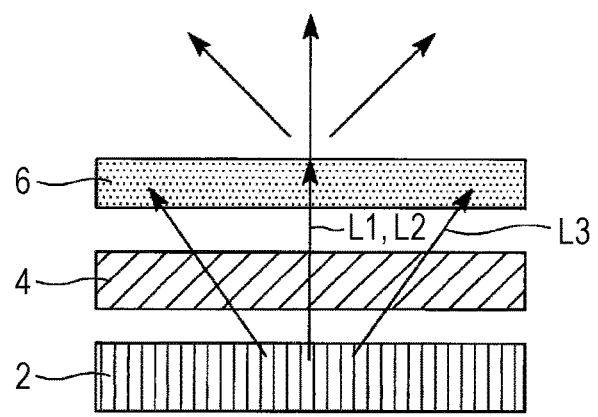
FIG. 11B schematically illustrates the effects of the light control film.

Due to these effects, light L1, L2 which is incident on the light control film 6 approximately vertically exits the light control film 6 with a wider angle distribution than before entering the light control film 6 as shown in FIG. 11B. The observer thus can see display well even with his/her line of sight tilted from the front direction (the direction of the normal) of the liquid crystal panel 4. Particularly because of the circular planar shape of the side face 41c of the light diffusing portion 41 (the reflection plane) in this embodiment, the angle distribution expands in all directions about the direction of the normal of the liquid crystal panel 4's screen. The observer thus can see display well from all directions. That is, use of the light control film 6 can expand the viewing angle of the liquid crystal panel 4. Meanwhile, light L3 which is diagonally incident on the light control film 6 is light that has diagonally passed through the liquid crystal panel 4, being light with different retardation than desired, or light that can cause decrease in so-called display contrast. The light control film 6 of this embodiment can eliminate such light in the light shielding portions 40, thereby increasing the display contrast.

As mentioned above, when light is incident on the light control film 6, the light is totally reflected due to the difference in refractive index at the interface between the light diffusing portion 41 and the air-cavity 43 and exits to the observer's side at a certain diffusion angle. If adhesive for bonding the light control film flows into and fills in air-cavities 43, however, the difference in refractive index at the interface between the light diffusing portion 41 and the air-cavity 43 becomes small. As a result, a higher proportion of light passes through the side face 41c of the light diffusing portion 41 without causing total reflection.

Since the light that has passed through the side face 41c of the light diffusing portion 41 is absorbed by the light shielding portions 40, optical efficiency then decreases. Other potential problems are blur of display and/or reduction in contrast because light that has passed through the side face 41c of the light diffusing portion 41 exits to the observer's side without being absorbed by the light shielding portions 40. As used herein, the term "optical efficiency" refers to the ratio of the total luminous flux emitted to the observer's side to the total luminous flux emitted from the backlight 2.

To address these problems, the light control film 6 of this embodiment has protrusion 44, which is a portion of a light diffusing portion 41 that projects toward the inner side of the opening of the air-cavity 43. That is, due to the presence of the protrusion 44, some air-cavities 43 have a blocked opening, or if any, an opening with a reduced diameter. Thus, as shown in FIG. 6A, adhesive for bonding the light control film is less likely to flow into air-cavities 43 and the adhesive layer 42 is formed below the light diffusing portion 41 and air-cavities 43. This secures a difference in refractive index at the interface between the light diffusing portion 41 and air-cavity 43, so that the proportion of light that passes through the side face 41c of the light diffusing portion 41 can be kept low. According to this embodiment, a light control film 6 having high optical efficiency can be thus realized.

In FIG. 6A, the ratio of the thickness D of the protrusion to the height T of the light diffusing portion 41 is preferably about 10%. This can secure a sufficiently large area of the interface between the light diffusing portion 41 and air-cavity 43. As a result, light incident on the light diffusing portion 41 can be efficiently emitted to the observer's side.

With conventional light control film, individual light diffusing portions are isolated; if the density of light diffusing portions is increased and the size of the light diffusing portion is reduced in order to increase the degree of light diffusion for example, the area of contact between the light diffusing portions and the liquid crystal panel becomes small. This in turn weakens the adhesion between the light diffusing portions and the liquid crystal panel and causes peeling, overturning, or the like of light diffusing portion due to external force and the like, preventing the attainment of intended light diffusion performance.

In contrast, in the light control film 6 of this embodiment, multiple air-cavities 43 are isolated and the light diffusing portion 41 is contiguously shaped like a wall. Furthermore, the light control film 6 has protrusions 44, which are a part of light diffusing portion 41 that protrudes toward the inner side of the opening of an air-cavity 43. This secures a sufficiently large area of contact between the light diffusing portion 41 and the liquid crystal panel 4. Accordingly, even if the density of air-cavities 43 is increased to reduce the volume of the light diffusing portion 41 in order to increase the degree of light diffusion, for example, adhesive can be sufficiently spreaded through the space between the light diffusing portion 41 and the liquid crystal panel 4. This results in stronger adhesion between the light diffusing portion 41 and the liquid crystal panel 4 than conventional constructions. This makes light diffusing portion of the light diffusing portion 41 less liable to be peeled off or overturn due to external force or the like and the intended light diffusion performance is attained.

Suppose that the patterning process of the light diffusing portion 41 employs an approach in which light is applied from the side of the coating 49 formed of transparent negative resist via a photomask. In this case, adjustment of alignment between the base 39 in which minute-sized light shielding portions 40 are formed and the photomask is extremely difficult, inevitably causing a displacement. As a consequence, the light diffusing portion 41 and light shielding portions 40 overlap, leading to possible reduction in light transmittance. In contrast, since the coating 49 is irradiated with light F from the backside of the base 39 using the light shielding portions 40 as a mask in this embodiment, light diffusing portion 41 is formed in the non-formation region of the light shielding portions 40 in self-alignment. As a result, the light diffusing portion 41 and the light shielding portions 40 do not overlap and the light transmittance can be reliably maintained.

In addition, as precise alignment work is not required, the manufacturing time can be shortened.

Supposing that light shielding portions 40 are not provided in the base 39, external light entering the light control film 6 from the viewing side repeats reflection on air-cavities 43 and the like and this is observed as scattered light on the viewing side. Such scattering caused by external light significantly reduces visibility in bright light. This causes "insufficient black", a phenomenon of a black color looking whitish in display of black, which lowers the contrast and prevents observation of a satisfactory image. These problems can be solved by provision of multiple light shielding portions 40 in the light control film 6 of this embodiment.

The inventors actually made a prototype of the light control film 6 based on the description of this embodiment. A SEM photograph of the surface of the light control film 6 prototype is shown in FIG. 12 and a SEM photograph of its cross section is shown in FIG. 13.

Figure 12:
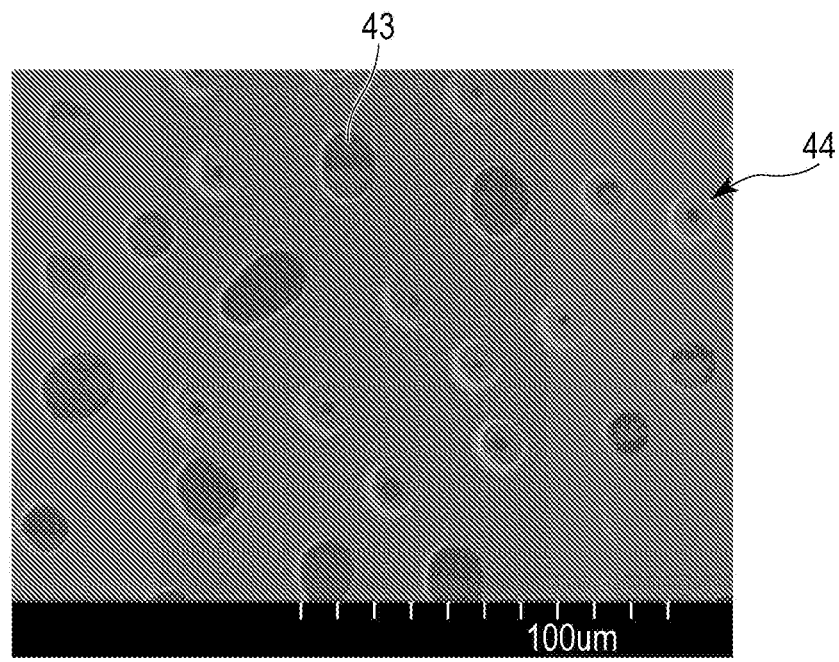
FIG. 12 is a SEM photograph of the surface of a light control film.
Figure 13:
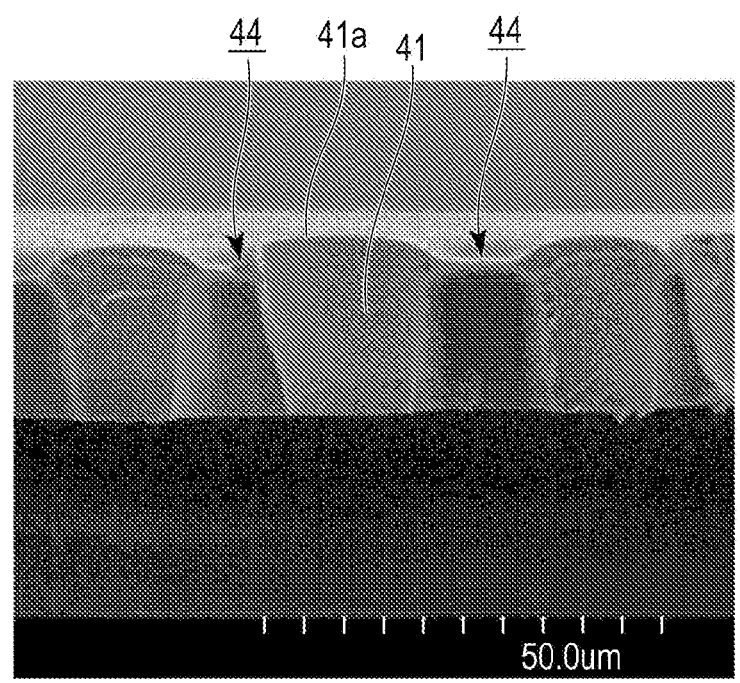
FIG. 13 is a SEM photograph of the cross section of the light control film.

As shown in FIG. 12, it was found that hood-like protrusions 44 were formed in some air-cavities 43 having a diameter of about 12 μm or less on the side of the light incident end face among multiple air-cavities 43. In the centers of these protrusions 44, holes that were assumed to be traces of outflow of coating solution dissolved in developer were observed. It was also found that protrusions 44 were in fact formed at positions slightly lower than the light incident end face 41a of the light diffusing portion 41 as shown in FIG. 13, rather than in the same plane as the light incident end face 41a of the light diffusing portion 41 as depicted in FIG. 6A. Even these protrusions 44 could sufficiently prevented adhesive from flowing into air-cavities 43. We have confirmed that improvement of optical efficiency and mechanical strength can be achieved by use of the light control film 6 compared to a light control film with no protrusion.

Second Embodiment

A second embodiment of the present invention is now described with reference to FIGS. 14A and 14B.

The basic structure of the liquid crystal display device in the second embodiment is the same as the first embodiment and differs from the first embodiment in the construction of the light control film. Thus, this embodiment omits description about the basic structure of the liquid crystal display device and focuses on the light control film.

Figure 14A:
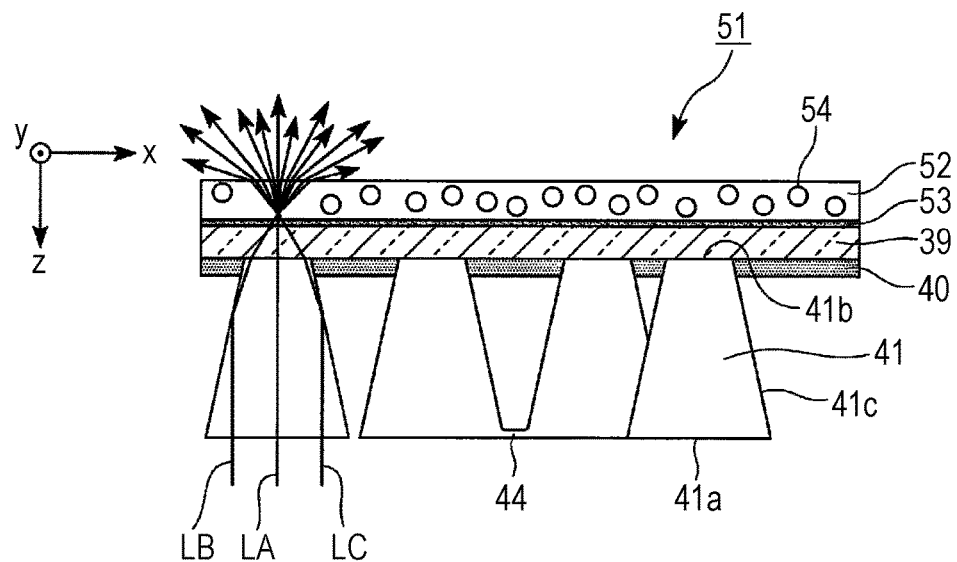
FIG. 14A is a cross-sectional view showing the light control film according to a second embodiment.
Figure 14B:
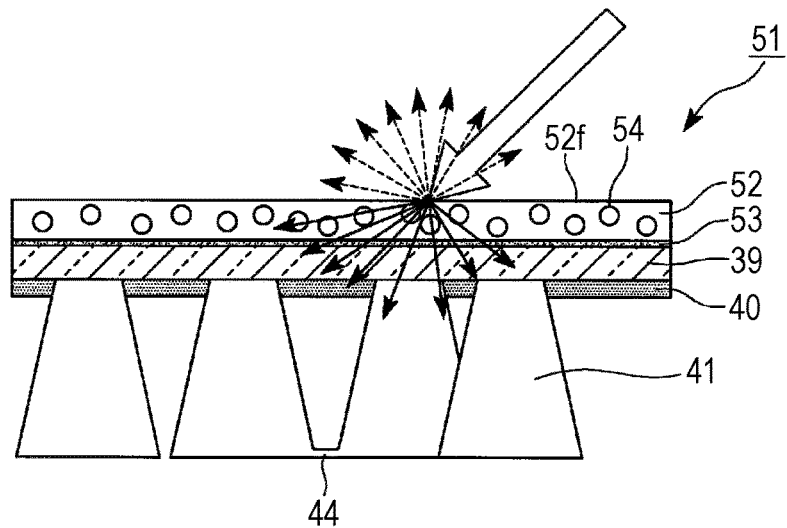
FIG. 14B is a cross-sectional view showing the light control film according to the second embodiment.

FIGS. 14A and 14B are cross-sectional views illustrating the light control film according to the second embodiment.

In FIGS. 14A and 14B, elements common to the drawings used in the first embodiment are denoted with the same reference characters and detailed description of such elements is omitted.

In a light control film 51 of this embodiment, a light scattering film 52 (a light scattering layer) is fixed to the viewing side surface of the base 39 with an adhesive layer 53 in addition to the structure of the light control film 6 in the first embodiment as illustrated in FIGS. 14A and 14B. The light scattering film 52 is formed from numerous light scatterers 54 such as acrylic beads dispersed in binder resin, for example, acrylic resin. The thickness of the light scattering film 52 is about 20 μm as an example. The diameter of the spherical light scatterers 54 is about 0.5 μm to 20 μm as an example. The thickness of the adhesive layer 53 is about 25 μm as an example. The light scattering film 52 functions as an isotropic scatterer. That is, the light scattering film 52 isotropically scatters light whose exit angle has been controlled in the light diffusing portion 41 and further widens the angle.

In addition to acrylic beads, the light scatterers 54 may be resin pieces formed from acrylic polymer, olefin-based polymer, vinyl-based polymer, cellulose-based polymer, amide-based polymer, fluorine-based polymer, urethane-based polymer, silicone-based polymer, imide-based polymer, or the like, or transparent material such as glass beads. Besides such transparent substances, scatterers and reflectors with no light absorption may be used. Alternatively, the light scatterers 54 may be formed from air bubbles dispersed in the light diffusing portion 41. Individual light scatterers 54 may be formed in various shapes, such as sphere, oval sphere, flat plate, and polyhedron. The size of the light scatterers 54 may be either uniform or non-uniform.

In this embodiment, the light scattering film 52 also functions as a non-glare treatment layer (anti-glare layer). The non-glare treatment layer may also be formed by sandblasting or embossing of the base 39, for example. In this embodiment, non-glare treatment is implemented by bonding a light scattering film 52 containing multiple light scatterers 54 to the one surface of the base 39. With this construction, the light scattering film 52 functions as the non-glare treatment layer, thus eliminating the necessity to separately providing a non-glare treatment layer. This can simplify the device and also make it thin.

While the light scattering film 52 is positioned on the outer side of the adhesive layer 53 in this embodiment, this is not a limitation. For example, the adhesive layer 53 itself may have light scattering property. Such a construction can be realized by dispersing numerous light scatterers in the adhesive layer 53, for example. The adhesive layer 53 may be any adhesive substance appropriate for the material to be bonded, such as rubber-based, acrylic-based, silicone-based, vinyl alkyl ether-based, polyvinyl alcohol-based, polyvinyl pyrolidone-based, polyacrylamide-based, or cellulose-based adhesives. Adhesive substances with high transparency and/or weather resistance are particularly preferable. Preferably, the adhesive layer 53 is protected with a separator or the like until it is used.

With the light control film 51 in this embodiment, the light scattering film 52 is disposed on the outermost surface of the light control film 51 as shown in FIG. 14A. Accordingly, light LA, LB, LC incident on the light incident end face 41a of the light diffusing portion 41 undergoes control of their exit angle in the light diffusing portion 41 and then isotropically scatters in the light scattering film 52. As a result, light with different angles emerges from the light scattering film 52.

Meanwhile, as illustrated in FIG. 14B, the light scattering film 52 is structured such that light incident from the upper surface of the light scattering film 52 (a surface 52f on the opposite side of the light diffusing portion 41) and reflected off the interface between the base, such as binder resin, and the light scatterers 54, or refracted in the light scatterers 54 to travel in a varied direction is forward-scattered. In FIG. 14B, forward scattered light is represented by solid arrows. Although back-scattered light is indicated with broken-line arrows for comparison, this kind of light is should not be generated. Such a total reflection condition can be satisfied by appropriately varying the particle size of the light scatterers 54 contained in the light scattering film 52, for example.

This embodiment also provides similar effects to the first embodiment, such as being able to provide a light control film having high mechanical strength and high optical efficiency. Especially because this embodiment provides the light scattering film 52 on the outermost surface of the light control film 51, light diffusion angles are prevented from concentrating in a particular direction. The light diffusion characteristics of the light control film 51 can be consequently smoother, providing bright display with a wide viewing angle.

[Variations of Light Shielding Portion Pattern]

While the light shielding portion was described as being circular in planar shape in the above described embodiment, it is not necessarily limited to a circular shape. Also, not all the light shielding portions need have the same shape.

Figure 15:
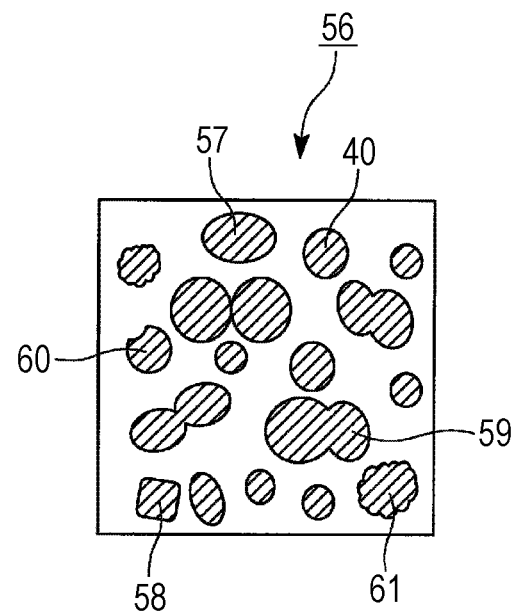
FIG. 15 is a plan view of another example of the light control film.

For example, a light control film 56 shown in FIG. 15 includes circular light shielding portions 40 as well as an elliptic light shielding portion 57 and a polygonal light shielding portion 58. The light control film 56 further includes a light shielding portion 59 shaped like neighboring light shielding portions being connected and a light shielding portion 60 with part of its contour missing. Light shielding portions may have irregularities in the contour like the light shielding portion shown at reference numeral 61. When an intentionally asymmetric luminous intensity distribution is required for some applications or usages of the display device, for example, when it is required to expand the viewing angle only to the upper side or right side of the screen, light shielding portions may have an asymmetric shape.

Figure 16A:
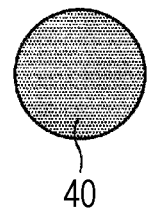
FIG. 16A is a plan view of another example of the light shielding portion shape.
Figure 16B:
FIG. 16B is a plan view of another example of the light shielding portion shape.
Figure 16C:
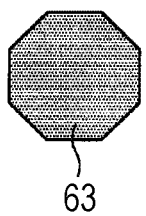
FIG. 16C is a plan view of another example of the light shielding portion shape.
Figure 16D:
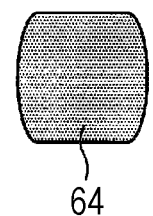
FIG. 16D is a plan view of another example of the light shielding portion shape.
Figure 16E:
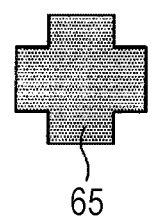
FIG. 16E is a plan view of another example of the light shielding portion shape.

As to the shape of individual light shielding portions, the above-described embodiment showed an example of light shielding portions 40 having a circular planar shape as illustrated in FIG. 16A. In place of such light shielding portions, a light shielding portion 62 having a square planar shape may be employed as shown in FIG. 16B for example. Alternatively, a light shielding portion 63 having a planar shape of a regular octagon may be employed as shown in FIG. 16C. Alternatively, a light shielding portion 64 shaped like a square with two opposite sides curved outward may be employed as shown in FIG. 16D. Alternatively, a light shielding portion 65 shaped like two rectangles intersecting in orthogonal directions may be employed as shown in FIG. 16E.

Figure 16F:
FIG. 16F is a plan view of another example of the light shielding portion shape.

Alternatively, a light shielding portion 66 having an oblong shape may be employed as shown in FIG. 16F.

Figure 16G:
FIG. 16G is a plan view of another example of the light shielding portion shape.
Figure 16H:
FIG. 16H is a plan view of another example of the light shielding portion shape.
Figure 16I:
FIG. 16I is a plan view of another example of the light shielding portion shape.
Figure 16J:
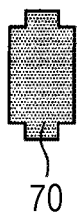
FIG. 16J is a plan view of another example of the light shielding portion shape.

Alternatively, a light shielding portion 67 having a long rectangle shape may be employed as shown in FIG. 16G. Alternatively, a light shielding portion 68 having a long octagonal shape may be employed as shown in FIG. 16H. Alternatively, a light shielding portion 69 shaped like a long rectangle with two opposite sides curved outward may be employed as shown in FIG. 16I. Alternatively, a light shielding portion 70 shaped like two rectangles having different aspect ratios intersecting in orthogonal directions may be employed as shown in FIG. 16J.

That is, the planar shape of light shielding portions may at least include an anisotropic shape having a long axis and a short axis as shown in FIGS. 16F to 16J. The planar shape of light shielding portions may include an isotropic shape like FIG. 16A in addition to anisotropic shapes. The planar shape of light shielding portions may at least include a polygon like FIGS. 16B to 16D and 16G to 16I. The planar shape of light shielding portions may include a shape consisting of a curved line and a straight line like FIGS. 16D and 16I.

Since the planar shape of the light shielding portions 40 in the above-described embodiments is circular as illustrated in FIG. 16A, the cross sectional shape of the side face 41c of the light diffusing portion 41, namely the reflection plane, is also circular. The light reflected off the side face 41c of the light diffusing portion 41 therefore diffuses in all directions, or 360 degrees. In contrast, with the square light shielding portion 62 shown in FIG. 16B for example, light diffuses in directions vertical to the sides of the square. With the rectangular light shielding portion 67 shown in FIG. 16G, light diffusion in the direction perpendicular to the long side is stronger than light diffusion in the direction perpendicular to the short side. Thus, as a function of side lengths, a light control film having different light diffusion strengths in the vertical (up-down) direction and the horizontal (left-right) direction can be realized. With the octagonal light shielding portion 63 shown in FIG. 16C, light diffusion can be made to concentrate in the vertical, horizontal, and 45-degree directions, for which viewing angle characteristics are of particular importance with a liquid crystal display device. Thus, when anisotropy of the viewing angle is required, different light diffusion characteristics can be obtained by varying the light shielding portion shape as appropriate.

Third Embodiment

A third embodiment of the present invention is now described with reference to FIG. 17.

The liquid crystal display device in the third embodiment has the same basic structure as the first embodiment and differs from the first embodiment in the shape of the light diffusing portion in the light control film. This embodiment thus omits description about the basic structure of the liquid crystal display device and focuses on the light control film.

Figure 17:
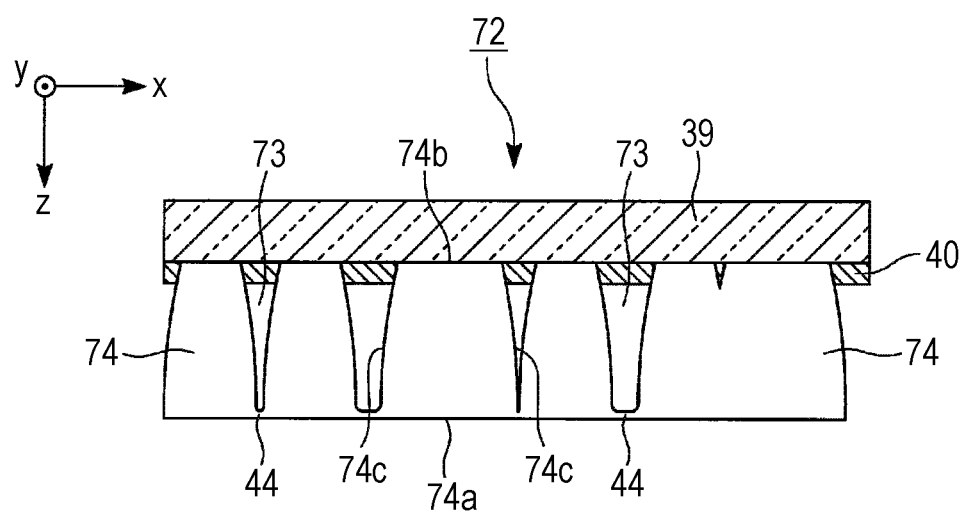
FIG. 17 is a cross-sectional view showing the light control film according to a third embodiment.

FIG. 17 is a cross-sectional view illustrating a viewing angle expanding film according to this embodiment.

In FIG. 17, elements common to the drawings used in the first embodiment are denoted with the same reference characters and detailed description of such elements is omitted.

The side face of the light diffusing portion in the first and second embodiments has a constant inclination angle. In contrast, with a light control film 72 of this embodiment, the inclination angle at the interface between an air-cavity 73 and a light diffusing portion 74 (a side face 74c of the light diffusing portion 74) continuously varies and the cross sectional shape of the light diffusing portion 74 has curved inclined planes. In the light control film 72, the side faces 74c of the light diffusing portion 74 are smoothly curved in a convex shape from a light exit end face 74b toward a light incident end face 74a as illustrated in FIG. 17. The inclination angle of the side face 74c of the light diffusing portion 74 therefore varies from location to location. Also in this embodiment, a protrusion 44, which is part of the light diffusing portion 74 projecting toward the inner side of the opening, is formed in at least some of multiple air-cavities 73. The third embodiment is otherwise similar to the first embodiment.

This embodiment also provides similar effects to the first and second embodiments, such as being able to provide a light control film having high mechanical strength and high optical efficiency.

With a constant inclination angle of the side faces of the light diffusing portion, unevenness of display can be observed at some viewing angles when the viewing angle is changed along the horizontal or vertical direction of the screen. To address such display unevenness, the first embodiment varies the inclination angles of the side faces at the level of the light diffusing portion. In contrast, with the light control film 72 in this embodiment, the inclination angle also varies depending on the location on the side face 74c of each individual light diffusing portion 74. The alignment distribution therefore becomes wider than the case of a constant inclination angle of the side face. This causes luminance to vary smoothly in accordance with the observation angle and improves viewing angle characteristics.

[Variations of Light Diffusing Portion]

Figure 18A:
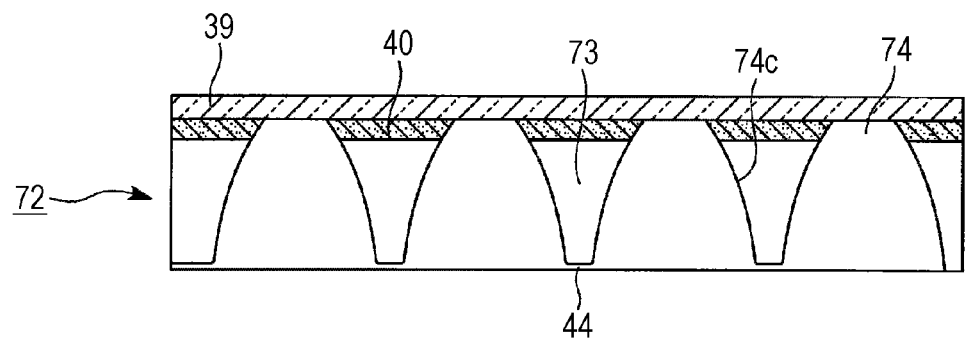
FIG. 18A is a cross-sectional view showing another example of the light control film.
Figure 18B:
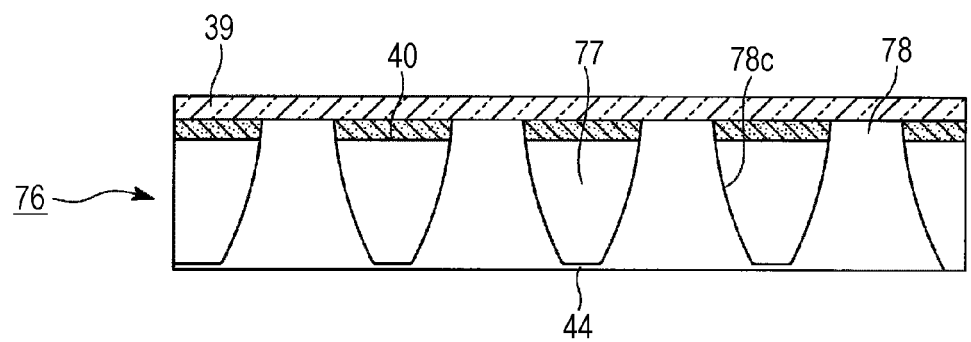
FIG. 18B is a cross-sectional view showing another example of the light control film.

The above-described embodiment illustrated a light control film 72 in which the interface 74c between the air-cavity 73 and the light diffusing portion 74 is curved to the air-cavity 73 side and air-cavities 73 are concave-shaped as illustrated in FIG. 18A. In contrast, the light control film 76 shown in FIG. 18B is constructed such that the interface 78c between the air-cavity 77 and the light diffusing portion 78 is curved to the light diffusing portion 78 side and the air-cavities 77 are convex shaped. This construction also can widen the luminous intensity distribution.

Figure 19A:
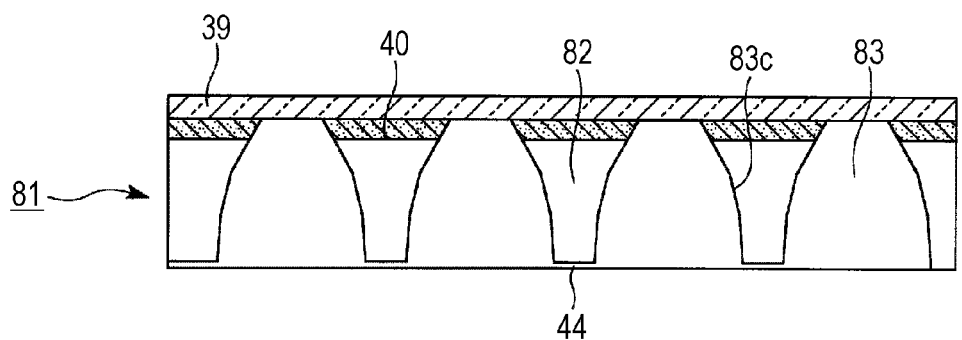
FIG. 19A is a cross-sectional view showing still another example of the light control film.
Figure 19B:
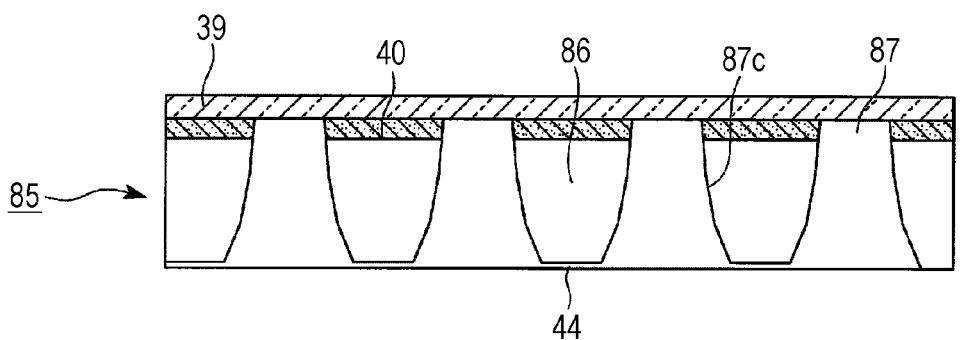
FIG. 19B is a cross-sectional view showing still another example of the light control film.

Alternatively, like light control film 81, 85 shown in FIGS. 19A and 19B, the interface between an air-cavity 82, 86 and a light diffusing portion 83, 87 (the side face of the light diffusing portion) may have multiple different inclination angles and the cross sectional shape of the light diffusing portion 83, 87 may have a polygonal inclined plane. With the light control film 81 shown in FIG. 19A, the interface 83c between the air-cavity 82 and the light diffusing portion 83 has three inclined planes of different inclination angles and the air-cavity 82 is concave shaped. With the light control film 85 shown in FIG. 19B, the interface 87c between the air-cavity 86 and the light diffusing portion 87 has three inclined planes of different inclination angles and the air-cavity 86 is convex shaped. These constructions can also widen the luminous intensity distribution.

Fourth Embodiment

A fourth embodiment of the present invention is now described with reference to FIG. 20.

The liquid crystal display device in the fourth embodiment has the same basic structure as the first embodiment and differs from the first embodiment in inclusion of a touch panel. This embodiment thus omits description about the basic structure of the liquid crystal display device and focuses on the construction of the touch panel.

Figure 20:
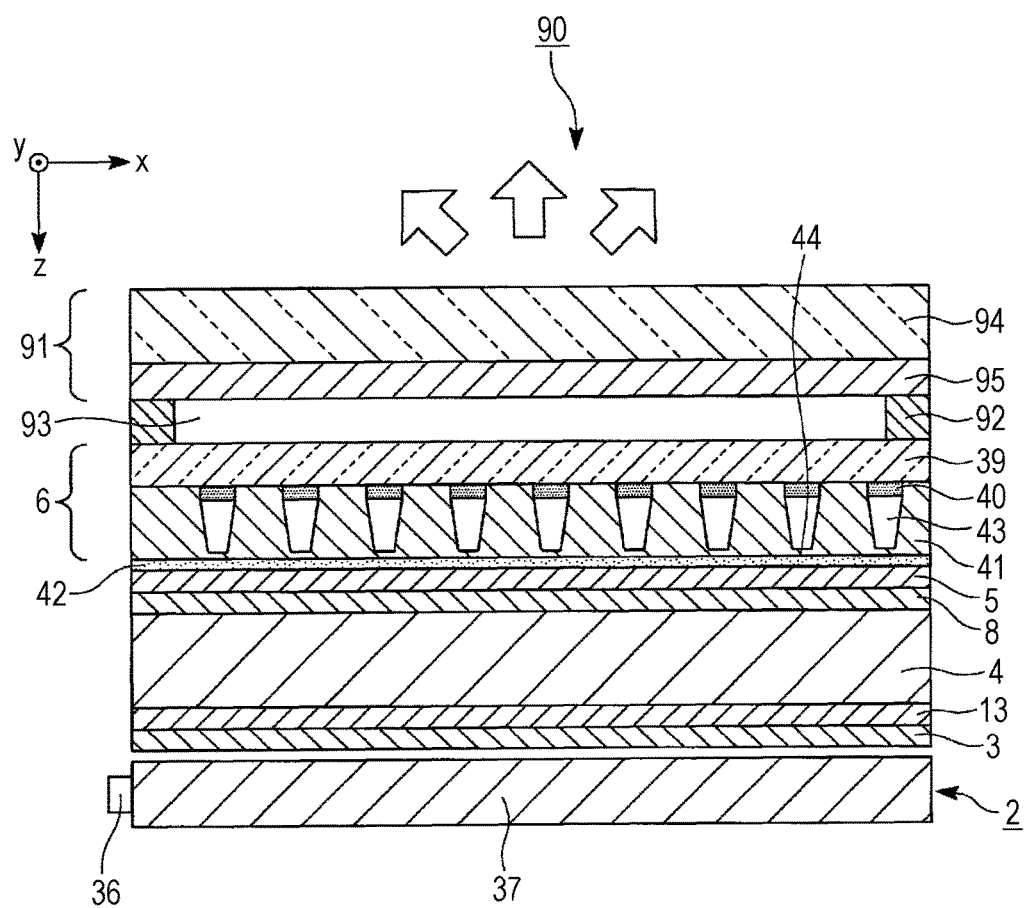
FIG. 20 is a cross-sectional view schematically showing the structure of the liquid crystal display device according to a fourth embodiment.

In FIG. 20, elements common to the drawings used in the first embodiment are denoted with the same reference characters and detailed description of such elements is omitted.

A liquid crystal display device 90 according to this embodiment is the same as the first embodiment in construction from the backlight 2 to the light control film 6 as shown in FIG. 20. A touch panel 91 (an information input device) is disposed on the viewing side of the base 39 constituting the light control film 6. In the following description, the base 39 constituting the light control film 6 will be referred to as "light control film base". The touch panel 91 is bonded to the light control film base 39 with adhesive material 92, such as double-sided adhesive tape, at the periphery of the light control film base 39. Between the touch panel 91 and the light control film base 39, a clearance equivalent to the thickness of the adhesive material 92 is formed. In other words, an air layer 93 is present between the touch panel 91 and the light control film base 39.

The touch panel 91 includes a base 94 and a position detection electrode 95. In the following description, the base 94 forming the touch panel 91 will be referred to as "touch panel base". On one surface of the touch panel base 94 made of glass or the like, the position detection electrode 95, which is formed from transparent electrically conductive material such as ITO or antimony-doped tin oxide (ATO), is formed. The position detection electrode 95 is formed by sputtering of ITO, ATO, and the like, and has a uniform sheet resistance of several hundreds to 2 kΩ/sq.

This embodiment employs a capacitive touch panel 91. In the capacitive touch panel 91, a minute voltage is applied to the four corners of the position detection electrode 95 when the touch panel 91 is seen in plan view, for example. When a given position above the position detection electrode 95 is touched by a finger, the touched point becomes grounded via the capacitance of the user's body. This causes the voltages at the four corners to change in accordance with the values of resistance between the ground point and the corners. A position detection circuit measures these changes in voltage as changes of current and determines the ground point, namely the position touched by the finger, from the measured values.

In addition to a capacitive touch panel, this embodiment can also be applied to a touch panel of any kind, such as resistive, ultrasonic, and optical.

Since the liquid crystal display device 90 of this embodiment includes a light control film 6 similar to the first embodiment, a liquid crystal display device having excellent viewing angle characteristics and further having information input functions can be realized. The user can enter information to an information processing device or the like in an interactive manner by touching the touch panel 91 with a finger or a pen while seeing an image of a wide viewing angle, for example.

Fifth Embodiment

Figure 22A:
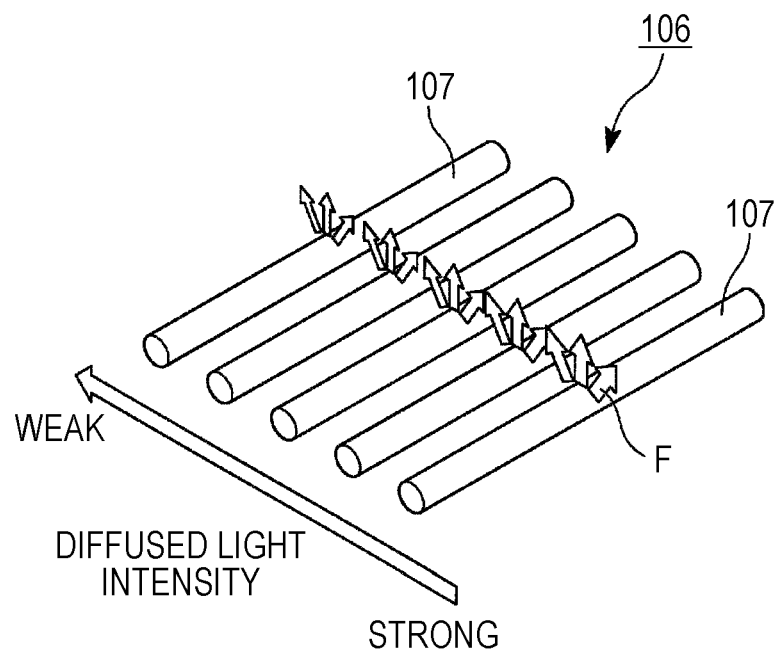
FIG. 22A is a perspective view showing the major components of the manufacturing device for the light control film.
Figure 22B:
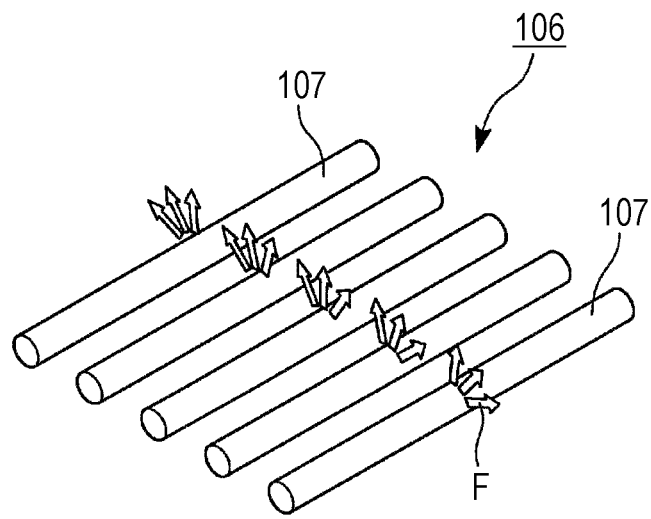
FIG. 22B is a perspective view showing the major components of the manufacturing device for the light control film.

A fifth embodiment of the present invention is described below with reference to FIGS. 21, 22A, and 22B.

This embodiment shows a variation of the manufacturing process of the light diffusion sheet.

FIG. 21 schematically shows an exemplary structure of a manufacturing device for a light diffusion sheet 7.

A manufacturing device 98 shown in FIG. 21 feeds an elongate base 39 roll-to-roll while applying a series of processes to it. The manufacturing device 98 employs printing instead of photolithography using the photomask 47 as described above for formation of light shielding portions 40.

A feed roller 99 for feeding the base 39 is provided at one end of the manufacturing device 98 while a take-up roller 100 for winding up the base 39 is provided on the other end; the base 39 moves from the feed roller 99 side to the take-up roller 100 side. Above the base 39, a printing device 101, a first drying device 102, an application device 103, a developing device 104, and a second drying device 105 are disposed in sequence from the feed roller 99 side to the take-up roller 100 side. Below the base 39, an exposure device 106 is installed.

The printing device 101 prints the light shielding portions 40 on the base 39. The first drying device 102 dries the light shielding portions 40 formed by printing. The application device 103 applies transparent negative resist to the light shielding portions 40 to form the coating 49. The developing device 104 develops the transparent negative resist after exposure with developer. The second drying device 105 dries the base 39 in which light diffusing portion 41 made of developed transparent resist has been formed. It is also possible to subsequently further bond the base 39 having the light diffusing portion 41 formed therein to the second polarizing plate 5 so as to integrate the light control film 6 and the second polarizing plate 5.

The exposure device 106 performs exposure of coating 49 made from transparent negative resist from the side of the base 39. FIGS. 22A and 22B illustrate only the exposure device 106 of the manufacturing device 98. The exposure device 106 has multiple light sources 107 as shown in FIG. 22A, and the intensity of diffused light F may vary, such as the intensity of diffused light F from the light sources 107 gradually lowers as the base 39 travels. Alternatively, the exposure device 106 may gradually vary the exit angle of diffused light F from the light sources 107 as the base 39 moves as shown in FIG. 22B. By use of such an exposure device 106, the inclination angle of the side face 41c of the light diffusing portion 41 can be controlled to a desired angle.

While liquid resist is applied when the light shielding portions 40 or the light diffusing portion 41 are formed in the above-described example, film-type resist may be bonded to one surface of the base 39 instead.

Finally, the completed light control film 6 is bonded to the liquid crystal panel 4 using optical adhesive or the like such that the base 39 is oriented to the viewing side and the light diffusing portion 41 faces the second polarizing plate 5.

Through the process, the liquid crystal display device is completed.

Note that the technical scope of aspects of the invention is not limited to the above-described embodiments but various modifications may be made without departing from the scope of the invention. For example, while a liquid crystal display device was described as an example of the display unit in the above embodiments, the display unit is not limited to this. The present invention may also be applied to organic electroluminescent display devices, plasma displays, and the like.

While the light control film was described as being bonded to the second polarizing plate of the liquid crystal panel in the above embodiments, the light control film and the liquid crystal panel may not be necessarily in contact with each other. For example, other optical film, optical component, or the like may be interposed between the light control film and the liquid crystal panel. Alternatively, the light control film and the liquid crystal panel may be positioned apart from each other. Since an electroluminescent display device, a plasma display, or the like requires no polarizing plate, there will be no contact between the light control film and a polarizing plate.

It is also possible to provide at least one of an anti-reflection layer, a polarizing filter layer, an anti-static layer, a non-glare treatment layer, and an antifouling layer on the viewing side of the base of the light control film in the above-described embodiments. Such a construction can add functions such as reducing reflection of external light, preventing deposition of dust or soil, or preventing flaws depending on the type of the layer provided on the viewing side of the base to prevent aging of viewing angle characteristics.

Other specifics including arrangement or shapes of the light diffusing portion and the light shielding portions, dimensions and materials of the portions of the light control film, fabrication conditions for the manufacturing process are not limited to the above-described embodiments but may be modified as needed.

INDUSTRIAL APPLICABILITY

Several aspects of the present invention are applicable to various kinds of display device, such as liquid crystal display devices, organic electroluminescent display devices, and plasma displays.

REFERENCE SIGNS LIST

1, 90 liquid crystal display device (display device)
4 liquid crystal panel (display unit)
6, 51, 56, 72, 76, 81, 85 light control film (light control member, viewing angle expanding member)
39 base
40, 57, 58, 59, 60, 61, 62, 63, 64, 65, 66, 67, 68, 69, 70 light shielding portion
41, 74, 78, 83, 87 light diffusing portion
43, 43a, 43b, 43c, 73, 77, 82, 86 air-cavity
44 protrusion
52 light scattering film
91 touch panel (information input device)

The invention claimed is:

1. A light control member comprising:
a light transmissive base;
a plurality of light shielding portions defined so as to be scattered over one surface of the base; and
a light diffusing portion defined on the one surface of the base in a region other than a plurality of regions in which the plurality of light shielding portions are defined, wherein
the light diffusing portion includes a light exit end face on the base side, the light diffusing portion includes a light incident end face having a larger area than the light exit end face on a side opposite to the base side, a height between the light incident end face and the light exit end face of the light diffusing portion is greater than a thickness of the plurality of light shielding portions, a plurality of spaces defined by the plurality of light shielding portions and side faces of the light diffusing portion are air-cavities, and the light diffusing portion includes a protrusion at the light incident end face that projects toward an inner side of at least one of the plurality of spaces such that a diameter of the at least one of the plurality of spaces changes discontinuously.

2. The light control member according to claim 1, wherein the plurality of light shielding portions are arranged aperiodically when viewed from a direction normal to the one surface of the base.

3. The light control member according to claim 1, wherein at least one of the plurality of light shielding portions has different dimensions from the dimensions of other light shielding portions.

4. The light control member according to claim 1, wherein planar shapes of the plurality of light shielding portions as viewed from a direction normal to the one surface of the base include an anisotropic shape having a long axis and a short axis.

5. The light control member according to claim 4, wherein the planar shapes of the plurality of light shielding portions as viewed from the direction normal to the one surface of the base include an isotropic shape in addition to the anisotropic shape.

6. The light control member according to claim 1, wherein the planar shapes of the plurality of light shielding portions as viewed from a direction normal to the one surface of the base include a polygon.

7. The light control member according to claim 1, wherein the planar shapes of the plurality of light shielding portions as viewed from a direction normal to the one surface of the base include a shape consisting of a curved line and a straight line.

8. The light control member according to claim 1, wherein the air-cavity is filled with air or inert gas.

9. The light control member according to claim 1, wherein an inclination angle of at least one of a plurality of side faces of the light diffusing portion is different from the inclination angles of other side faces.

10. The light control member according to claim 1, wherein the inclination angle of the side faces of the light diffusing portion varies depending on location between the light exit end face and the light incident end face.

11. The light control member according to claim 10, wherein the side faces of the light diffusing portion are inclined planes having a curved cross section with a continuously varying inclination angle.

12. The light control member according to claim 10, wherein the side faces of the light diffusing portion are inclined planes with a polygonal cross section having a plurality of different inclination angles.

13. The light control member according to claim 1, further comprising:

a light scattering layer that scatters light emitted from the light diffusing portion on a light exit side of the light diffusing portion.

14. The light control member according to claim 1, wherein the light shielding portions consist of black resin containing at least one of light absorbing pigment, light absorbing dye, and carbon black, or metal, or multilayer film of metallic oxides.

15. The light control member according to claim 1, wherein at least one of an anti-reflection layer, a polarizing filter layer, an anti-static layer, a non-glare treatment layer, and an antifouling layer is provided on a side opposite to the one surface of the base.

16. A display device comprising:

a display; and a viewing angle expanding member on a viewing side of the display that causes incident light from the display to exit with a wider angle distribution than before incidence, the viewing angle expanding member includes a light control member, wherein the light control member includes:

a light transmissive base;

a plurality of light shielding portions defined so as to be scattered over one surface of the base; and a light diffusing portion defined on the one surface of the base in a region other than a region in which the plurality of light shielding portions are defined, wherein the light diffusing portion includes a light exit end face on the base side, the light diffusing portion includes a light incident end face having a larger area than the light exit end face on a side opposite to the base side, a height between the light incident end face and the light exit end face of the light diffusing portion is greater than a thickness of the plurality of light shielding portions, a plurality of spaces defined by the plurality of light shielding portions and side faces of the light diffusing portion are air-cavities, and the light diffusing portion includes a protrusion at the incident end face that projects toward an inner side of at least one of the plurality of spaces such that a diameter of the at least one of the plurality of spaces changes discontinuously.

17. The display device according to claim 16, wherein the display and the viewing angle expanding member are bonded together with adhesive.

18. The display device according to claim 16, wherein an information input device is provided on a viewing side of the viewing angle expanding member.

19. The display device according to claim 16, wherein the display includes a light source and a light modulating element for modulating light from the light source, and the light source emits light having directivity.

20. The display device according to claim 19, wherein the light modulating element is a liquid crystal display element.

* * * * *